US012356512B2

(12) United States Patent
Smith et al.

(10) Patent No.: US 12,356,512 B2
(45) Date of Patent: Jul. 8, 2025

(54) BERYLLIUM OXIDE INTEGRAL RESISTANCE HEATERS

(71) Applicant: Materion Corporation, Mayfield Heights, OH (US)

(72) Inventors: Larry T. Smith, Mayfield Heights, OH (US); Samuel J. Hayes, Mayfield Heights, OH (US)

(73) Assignee: Materion Corporation, Mayfield Heights, OH (US)

( * ) Notice: Subject to any disclaimer, the term of this patent is extended or adjusted under 35 U.S.C. 154(b) by 683 days.

(21) Appl. No.: 15/451,612

(22) Filed: Mar. 7, 2017

(65) Prior Publication Data

US 2017/0295612 A1 Oct. 12, 2017

Related U.S. Application Data

(60) Provisional application No. 62/319,388, filed on Apr. 7, 2016.

(51) Int. Cl.

| | |
|---|---|
| ***H05B 3/26*** | (2006.01) |
| ***H05B 3/03*** | (2006.01) |
| ***H05B 3/12*** | (2006.01) |
| ***H05B 3/28*** | (2006.01) |
| ***H05B 3/42*** | (2006.01) |

(52) U.S. Cl.

CPC ............... *H05B 3/265* (2013.01); *H05B 3/03* (2013.01); *H05B 3/12* (2013.01); *H05B 3/283* (2013.01); *H05B 3/42* (2013.01); *H05B 2203/004* (2013.01); *H05B 2203/013* (2013.01); *H05B 2203/017* (2013.01); *H05B 2203/018* (2013.01)

(58) Field of Classification Search

CPC .............. H01L 21/67103; H05B 3/143; H05B 2203/004; H05B 2203/013; H05B 2203/017; H05B 2203/018; H05B 3/03; H05B 3/12; H05B 3/265; H05B 3/283; H05B 3/42; H05B 3/06

USPC ........ 219/444.539, 390, 418, 498, 820, 444, 219/465; 392/418

See application file for complete search history.

(56) References Cited

U.S. PATENT DOCUMENTS

| | | | | |
|---|---|---|---|---|
| 4,035,613 A * | 7/1977 | Sagawa | H05B 3/18 | 219/552 |
| 4,604,299 A * | 8/1986 | De Luca | C04B 41/009 | 427/304 |
| 4,688,150 A * | 8/1987 | Peterson | H05K 3/325 | 174/534 |

(Continued)

FOREIGN PATENT DOCUMENTS

| | | |
|---|---|---|
| CN | 1068006 A | 1/1993 |
| CN | 101982010 A | 2/2011 |

(Continued)

OTHER PUBLICATIONS

English Translation JP, 08-255679,A (Year: 1996).*

(Continued)

*Primary Examiner* — Tiffany T Tran

(74) *Attorney, Agent, or Firm* — COZEN O'CONNOR

(57) ABSTRACT

An integral resistance heater is disclosed. The heater includes a beryllium oxide (BeO) ceramic body having a first surface and a second surface. A heating element is formed from a metal foil or metallizing paint and is printed onto the top or second surface of the beryllium oxide ceramic body.

19 Claims, 17 Drawing Sheets

(56) References Cited

U.S. PATENT DOCUMENTS 4,774,396 A * 9/1988 Salit .......................... H05B 3/10 219/552
4,859,835 A * 8/1989 Balderson ................ H05B 3/26 338/308
5,151,845 A * 9/1992 Watanabe ........... H01L 21/6831 279/128
5,378,667 A * 1/1995 Kim ........................ C04B 35/47 501/136
5,449,886 A * 9/1995 Zhu .......................... H05B 3/06 219/541
6,211,496 B1 4/2001 Uchiyama
6,475,606 B2 * 11/2002 Niwa .................... C04B 41/009 219/538
8,547,005 B1 * 10/2013 Smith ....................... H01J 1/14 313/341
2003/0044653 A1 * 3/2003 Hiramatsu .......... H01L 21/6833 428/323
2003/0066828 A1 * 4/2003 Boardman ............. H05B 3/262 219/548
2003/0080110 A1 * 5/2003 Hiramatsu ............. H05B 3/265 219/466.1
2004/0026402 A1 * 2/2004 Ito ..................... H01L 21/67109 219/444.1
2004/0035846 A1 * 2/2004 Hiramatsu ........ H01L 21/67109 219/444.1
2004/0071945 A1 * 4/2004 Ito ....................... H01L 21/6831 428/209
2004/0074586 A1 * 4/2004 Hiramatsu .......... C04B 35/6264 279/128
2004/0155025 A1 * 8/2004 Ito .......................... H05B 3/143 219/444.1
2008/0193777 A1 * 8/2008 Tuan ....................... B32B 15/20 428/434
2009/0272732 A1 * 11/2009 Ptasienski ................ H05B 3/28 219/543
2010/0108661 A1 5/2010 Vontell et al.
2013/0264203 A1 * 10/2013 Gamboa .................. H05B 3/16 204/424
2013/0319762 A1 * 12/2013 Harris ..................... B32B 18/00 174/94 R
2014/0131904 A1 * 5/2014 Tang ................... A61M 16/022 261/142
2014/0144571 A1 * 5/2014 Addiego ............... C04B 35/645 156/89.11
2015/0014297 A1 * 1/2015 Kim ....................... H05B 3/283 219/444.1
2015/0016083 A1 * 1/2015 Nootens ................. H01C 17/00 361/820
2016/0376011 A1 * 12/2016 Palfreyman ............ B64D 15/12 244/129.3

FOREIGN PATENT DOCUMENTS

DE 2329424 A1 * 1/1975 ............ H05B 3/265
EP 0105993 A1 4/1984
EP 0545603 A1 * 6/1993
EP 0812665 A1 12/1997
EP 1120997 A1 8/2001
JP S52123357 A 10/1977
JP S5743382 A 3/1982
JP S57210588 A 12/1982
JP 02215077 A 8/1990
JP H08243991 A 9/1996
JP 08255679 A * 10/1996
JP 2003-029559 A 1/2003
JP 2004273227 A 9/2004
JP 2007-088484 A 4/2007
JP 2014-132560 A 7/2014
KR 20100109438 A 10/2010
WO WO-2015153756 A1 * 10/2015 ....... H01L 21/67103

OTHER PUBLICATIONS

English Translation of JP2007088484A (Year: 2006).*
English Translation of DE2329424 (Year: 1975).*
Beryllium Oxide(BeO) Ceramics-High Thermal Conductivity—Great Ceramic (Year: 2021).*
International Search Report and Written Opinion for International Application No. PCT/US2017/021047 dated May 31, 2017.

* cited by examiner

BERYLLIUM OXIDE INTEGRAL RESISTANCE HEATERS

CROSS-REFERENCE TO RELATED APPLICATIONS

This application claims priority to U.S. Provisional Patent Application Ser. No. 62/319,388, filed on Apr. 7, 2016, which is fully incorporated by reference herein.

BACKGROUND

The present disclosure relates to electrical resistance heaters integrated onto or within a ceramic body comprising beryllium oxide (BeO). The integral resistance heaters find particular application in the field of semiconductor fabrication and manipulation, and will be described with particular reference thereto. However, it is to be appreciated that the present disclosure is also amenable to other like applications.

Integral resistance heaters transfer heat energy through a medium more rapidly via conduction (compared to convection or radiation) according to Joule's first law. However, the medium must be electrically insulative or the heater will short out. Most conventional thermally conductive materials are metals, which are electrically conductive and thus would not be suitable as a medium for a direct contact integral heater. Most conventional electrically insulative materials (such as ceramics and glasses) have low thermal conductivity, which would conduct heat poorly.

It would be desirable to provide integral resistance heaters that minimize these problems.

BRIEF DESCRIPTION

Disclosed in various embodiments herein are integral resistance heaters in which a heating element is directly in contact with and bonded to a beryllium oxide (BeO) ceramic body. Beryllium oxide has the unique property of being both electrically insulative and highly thermally conductive.

In some embodiments disclosed herein, the integral resistance heater includes beryllium oxide (BeO) ceramic body having a first surface and a second surface. A heating element is formed from a refractory metallizing layer. The heating element is directly in contact with and bonded to the first surface or the second surface of the BeO ceramic body.

In other embodiments disclosed herein, methods of forming an integral resistance heater include forming a heating element by applying a refractory metallizing paint onto the first surface or the second surface of a BeO ceramic body. In these embodiments, it is generally contemplated that the ceramic body has a large length and width relative to the thickness of the ceramic body.

In yet other embodiments disclosed herein, the integral resistance heater includes a BeO ceramic tube extending between a first terminal and a second terminal. A heating element is formed from a refractory metallizing paint and is applied directly on an exterior surface of the BeO ceramic tube, i.e. on the circumferential surface/sidewall of the tube (rather than the two end surfaces thereon). A first end of the heating element is connected to the first terminal and a second end of the heating element is connected to the second terminal. These terminals can be joined to the BeO ceramic tube by soldering, brazing, or tack welding.

In other embodiments, an integral resistance heater is disclosed for use in a heater pack. The heater pack includes a BeO ceramic top plate. An intermediate BeO ceramic body has a first surface, a second surface, and a heating element formed from a refractory metallizing paint printed onto the first surface or the second surface. A BeO ceramic base plate is also included. The top plate, intermediate ceramic body, and the base plate form a "sandwich", with the intermediate ceramic body in the middle. A heater terminal extends through the BeO ceramic base plate and connects to the heating element of the intermediate BeO ceramic body. These terminals are joined to the BeO with either solder, or braze, or tack weld, or mechanical screw threads. Finally, at least one power source can be connected to the heater terminal for controlling the heating element according to Ohm's law, and its Volts Alternating Current (VAC) equivalent form $P(t)=I(t)V(t)$.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
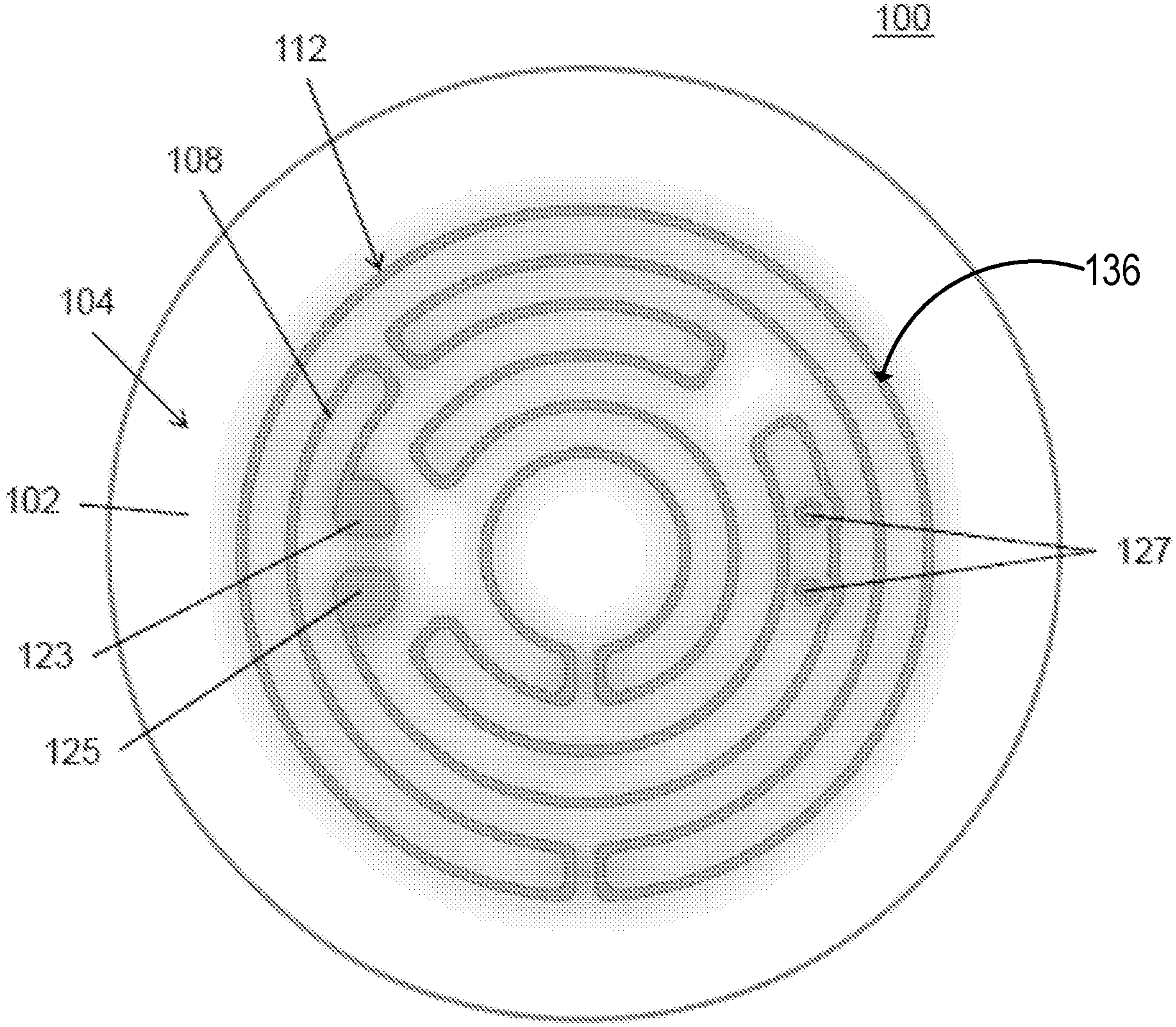
FIG. 1 is a top view of an integral resistance heater according to the present disclosure.

A more complete understanding of the processes and devices disclosed herein can be obtained by reference to the accompanying drawings. These figures are merely schematic representations based on convenience and ease and are, therefore, not intended to indicate relative size and dimensions of the assemblies or components thereof.

The present disclosure may be understood more readily by reference to the following detailed description of desired embodiments and the examples included therein. In the following specification and the claims which follow, reference will be made to a number of terms which shall be defined to have the following meanings.

The singular forms "a," "an," and "the" include plural referents unless the context clearly dictates otherwise.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

As used herein, approximating language, such as "about" and "substantially," may be applied to modify any quantitative representation that may vary without resulting in a change in the basic function to which it is related. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. The terms "typical" and "typically" refer to a standard and common practice.

The term "room temperature" refers to a range of from 20° C. to 25° C.

Several terms are used herein to refer to specific patterns. The term "spiral" as used herein refers to a curve on a plane that winds around a fixed center point at a continuously increasing distance from the point. The term "Archimedean spiral" refers to a spiral having the property that any ray originating from the center point intersects successive turnings of the spiral in points with a constant separation distance. The terms "maze" and "labyrinth" refer to a pattern of discontinuous lines and/or curves that are joined together to form a circuit that resemble a set of walls forming a series of different paths between the walls. The term "unicursal" refers to a "maze" or "labyrinth" having a single pathway to the center of the pattern. The term "multicursal" refers to a "maze" or "labyrinth" having multiple (i.e., more than one) pathways to the center of the pattern. The term "zigzag" refers to a pattern in which a single line has abrupt turns such that the line runs back and forth between a first side and a second side, with the line beginning at a first end and ending at a second end.

The terms "top" and "base" are used herein. These terms indicate relative orientation, not an absolute orientation.

Methods for forming integral resistance heaters and the heaters formed therefrom are disclosed. The integral resistance heaters disclosed herein can be used in a heater pack useful in the silicon wafer industry, e.g., during semiconductor fabrication. The integral resistance heater includes a beryllium oxide (BeO) ceramic body and an electrical heating element directly in contact with and bonded to the BeO ceramic body. The heating element may be formed with a metallizing paint, which generally forms a thick film of finely divided refractory metal, upon application to the ceramic body. The BeO ceramic body has a unique combination of being highly thermally conductive and electrically insulative. This permits intimate contact with the heating element without causing electrical shorting thereof. BeO heaters can also be cycled fast (ramp up, cool down) due to the high thermal conductivity. BeO is also a high temperature refractory material. BeO is also electrically insulative and etch-resistant in corrosive atmospheres and corrosive liquids.

Referring now to FIG. 1, an integral resistance heater 100 generally includes a ceramic body 102 made from beryllium oxide (BeO). A heating element 108 is formed on a surface of the ceramic body. For example, the heating element can be printed onto a first surface 104 of the ceramic body, or on a second surface 106 (FIG. 5) of the ceramic body which is located opposite the first surface 104. Also visible here are the two ends 123, 125 of the heating element 108, which will be connected to an electrical source. Also visible are two pass-throughs 127 through which, as further explained with respect to FIG. 5, permit electrical connections to a heating element on an opposite surface of the ceramic body.

The BeO ceramic body 102 is shown in FIG. 1 as having a disc shape. In this disc shape, the first surface and the second surface of the body have a radius that is generally greater than the thickness of the body. However, it should be understood that the BeO ceramic body can have any shape suitable for use as an integral resistance heater. For example, the body can have a rectangular first surface, or the ceramic body can be a tube in which the thickness of the body is greater than the radius thereof.

The heating element of the BeO ceramic body is formed from a paint containing a refractory metallic that is electrically conductive (i.e., a metallizing paint). The metallizing paint can contain either molybdenum (Mo) or tungsten (W), and can contain other ingredients. In some embodiments, the metallizing paint contains "moly-manganese", which is a mixture of molybdenum, manganese, and glass powders. In some particular embodiments, the metallizing paint contains molybdenum disilicide ($MoSi_2$). Molybdenum disilicide is also highly refractory (m.p. 2030° C.), and can operate up to about 1800° C.

The metallizing paint may be applied using one of several techniques, depending on the shape and size of the BeO ceramic body. These techniques include screen printing, roll coating with a pinstriping wheel, hand painting, air brush spraying, immersion dip, centrifugal coating, and needle painting with syringe. In some particular embodiments, one more layers of metallizing paint are applied by screen-printing, roll coating or air brushing. The metallizing paint can form a thick film that acts as the heating element on the surface of the BeO ceramic body. The desired thickness depends on the resistance required to produce heat from current provided by a power supply as well as other factors. However, thickness alone is not the only factor that drives electrical resistance; the metallizing paint recipe (i.e., the metal to glass ratio) and the amount of sintering (i.e., shrinkage, capillary action of glass, and oxy-redox reactions) also change electrical resistivity. In some embodiments the thickness of the thick film can be typically between about 300 and 900 microinches (7.62 μm to 22.86 μm), but can be decreased or increased with multiple applications of the metallizing paint, in order to achieve the desired electrical resistance required to obey Joule's first law of heating. The metallizing paint can also be applied in patterns for more intricate designs of the heating element, such as the maze pattern 112 illustrated in FIG. 1.

Figure 2:
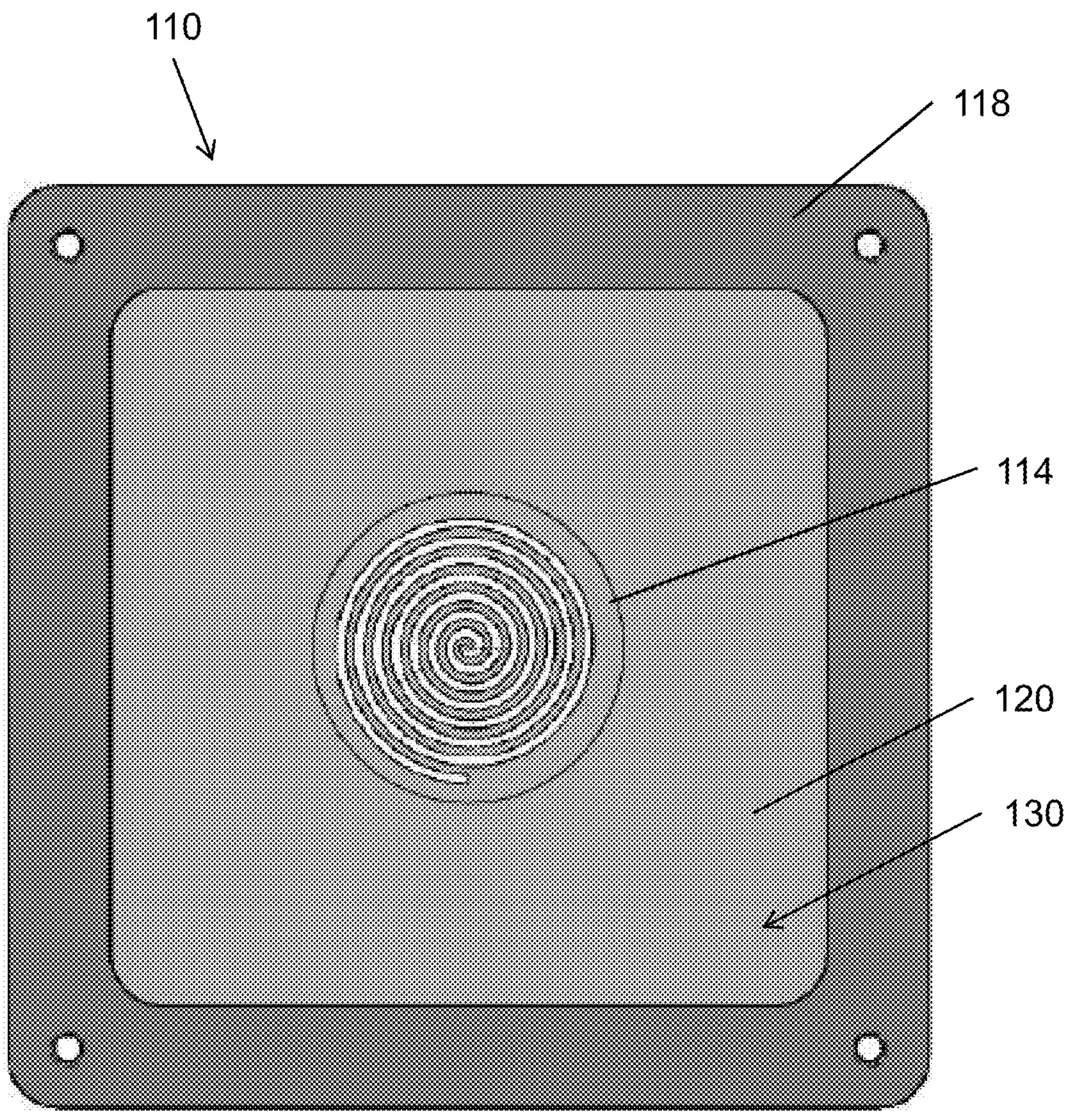
FIG. 2 is a top view of a screen for printing a heating element having a spiral pattern.

In some particular embodiments, the metallizing paint is applied using a screen printing process to form the heating element. FIG. 2 illustrates a screen 110 used for screen printing. Metallizing paint is used to form a heating element having a spiral pattern 114. In some embodiments, the spiral is an Archimedean spiral. The screen generally comprises a piece of mesh 120 stretched over a frame 118. The desired pattern is formed by masking off parts of the screen in the negative image of the pattern. Put another way, the spiral pattern 114 indicates where the metallizing paint will appear on the BeO ceramic body.

Screen printing can generally include a pre-press process before printing occurs, where an original opaque image of the desired pattern is created on a transparent overlay. A screen having an appropriate mesh count is then selected. The screen is coated with a UV curable emulsion, indicated by shaded area 130. The overlay is placed over the screen and exposed with a UV light source to cure the emulsion. The screen is then washed, leaving behind a negative stencil of the desired pattern on the mesh. The first surface of the BeO ceramic body can be coated with a wide pallet tape to protect from unwanted leaks through the screen which may stain the BeO ceramic body. Finally, any unwanted pin-holes in the emulsion can be blocked out with tapes, specialty emulsions, or block-out pens. This prevents the metallizing paint from continuing through the pin-holes and leaving unwanted marks on the BeO ceramic body.

Printing proceeds by placing the screen 110 atop the first surface or second surface of the BeO ceramic body. The metallizing paint is placed on top of the screen, and a flood bar is used to push the metallizing paint through the holes in the mesh 120. The flood bar is initially placed at the rear of the screen and behind a reservoir of metallizing paint. The screen is lifted to prevent contact with the BeO ceramic body. The flood bar is then pulled to the front of the screen with a slight amount of downward force, effectively filling the mesh openings with metallizing paint and moving the reservoir to the front of the screen. A rubber blade or squeegee is used to move the mesh down to the BeO ceramic body and the squeegee is pushed to the rear of the screen. The metallizing paint that is in the mesh opening is pumped or squeezed by hydraulic action onto the BeO ceramic body in a controlled and prescribed amount. In other words, the wet metallizing paint is deposited proportionally to the thickness of the mesh and/or stencil. During a "snap-off" process, the squeegee moves toward the rear of the screen and tension causes the mesh to pull up and away from the surface of the BeO ceramic body. After snap-off, the metallizing paint is left on the surface of the BeO ceramic body in the desired pattern for the heating element.

Next, the screen can be re-coated with another layer of metallizing paint if desired. Alternatively, the screen may undergo a further dehazing step to remove haze or "ghost images" left behind in the screen after removing the emulsion.

After the metallizing paint has been deposited, sintering can be performed to facilitate a strong, hermetic bond of the metallizing paint to the BeO ceramic body. The non-metallic components in the metallization matrix will diffuse into the grain boundaries of the BeO ceramic body, supplementing its strength. The amount of sintering (i.e., the time and temperature) affects the volumetric composition of the conductive path for electrons. The atmosphere during sintering affects the oxidation and reduction reactions of the metallic and semi-metallic sub-oxides. The sintered layer becomes electrically conductive, allowing subsequent plating of the metallizing layer if desired, but is not necessary for heating. Plating can be performed by electrolytic (rack or barrel) or electroless processes. A variety of materials can be used for metal plating 136 (as shown in FIG. 1), including nickel (Ni), gold (Au), silver (Ag) and copper (Cu), although operating temperature and atmosphere should be considered.

The embodiment illustrated in FIG. 2 shows the frame 118 of the screen as being generally a square in shape. In some embodiments, the square frame can have a length and width of about 5 inches×5 inches. The mesh 120 can be a 325 mesh made from stainless steel. The wires of the mesh have a 30 degree bias with respect to the frame. The emulsion 130 has a thickness of about 0.5 mil (0.0127 mm). It should be understood from the present disclosure that such dimensions are only exemplary and that any suitable screen shape and size can be chosen as desired.

Figure 3A:
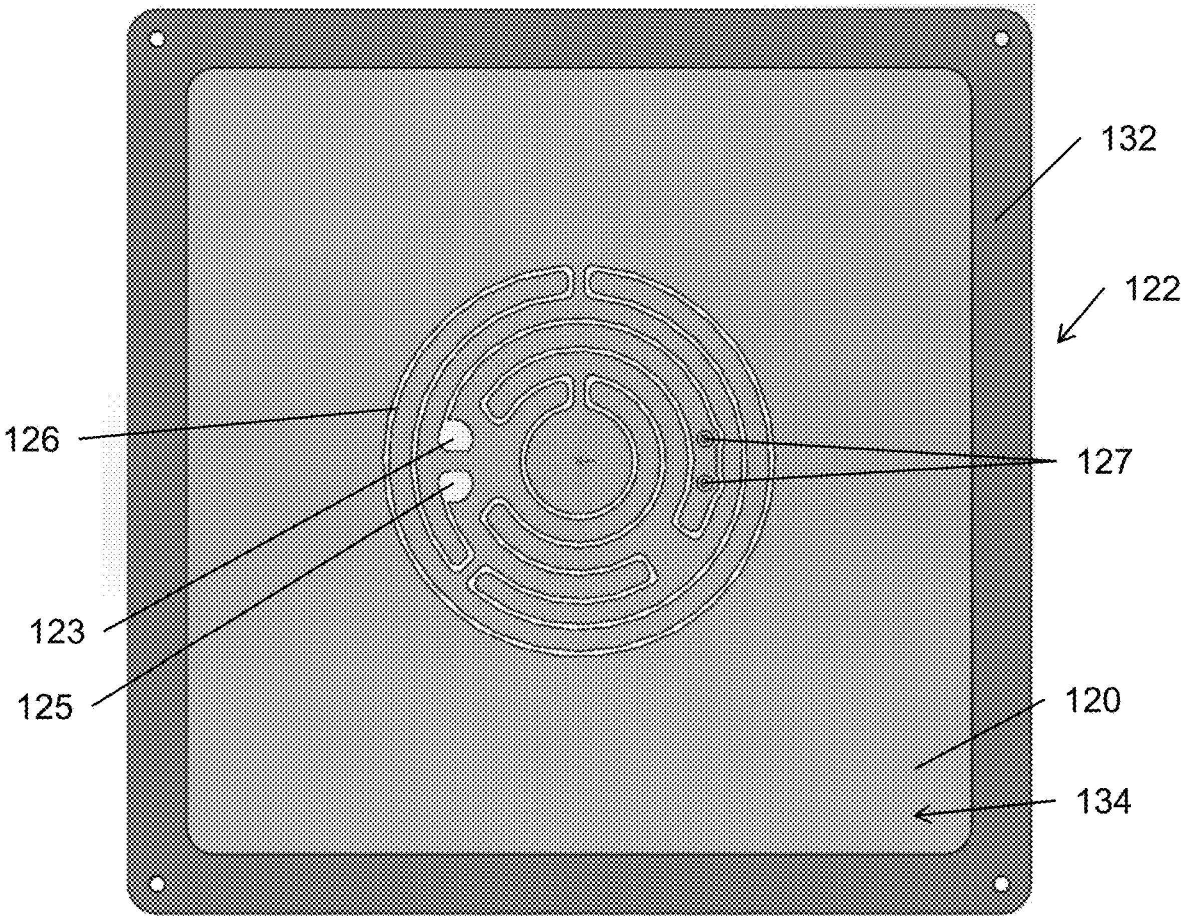
FIG. 3A is a top view of a first screen for printing a first zone of a dual-zone heating element having a maze pattern.
Figure 3B:
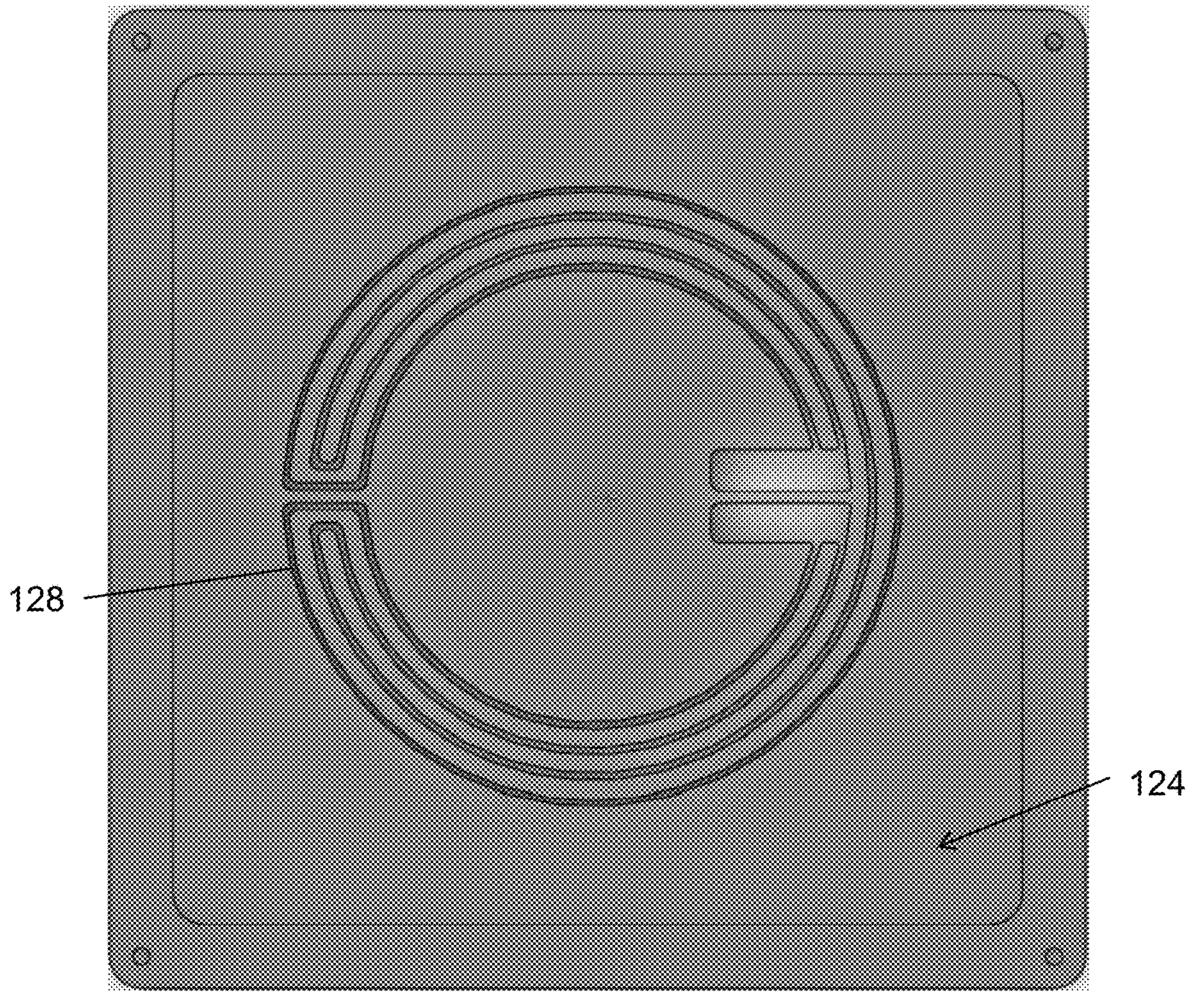
FIG. 3B is a top view of a second screen for printing a second zone of a dual-zone heating element having a maze pattern.
Figure 5:
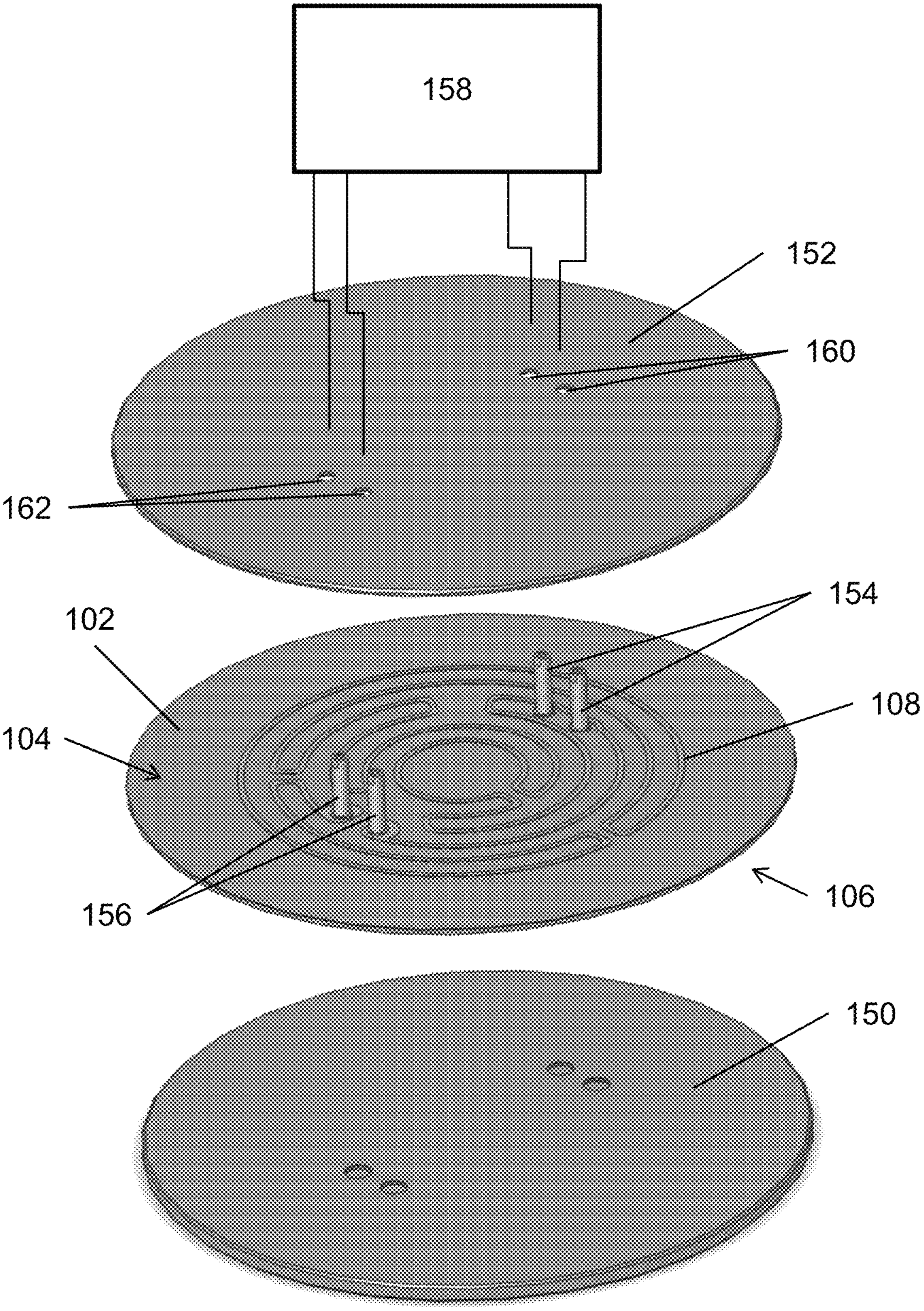
FIG. 5 is a 3D model of the components of a heater pack including an integral resistance heater according to the present disclosure.

FIG. 3A (not to scale) and FIG. 3B (not to scale) illustrate a method of screen printing that uses a first screen 122 to print a first heating element 126. A second screen 124 is then used to print a second heating element 128. In some embodiments, the first heating element can be printed on the first surface 104 of the BeO ceramic body 102 shown in FIG. 1 and the second heating element can be printed on the second surface 106 of the BeO ceramic body (FIG. 5). Both heating elements can be connected to the same terminals or to different terminals, and can be operated together or independently biased.

The first and second heating elements are shown in FIG. 3A and FIG. 3B as having a series of generally concentric circles which form a circular maze or labyrinth pattern. As illustrated here, the first heating element 126 is in the pattern of a unicursal labyrinth, and the second heating element 128 is also in the pattern of a unicursal labyrinth. However, it is contemplated that patterns of a multicursal labyrinth can also be used. In FIG. 3A, the terminals 123, 125 and the pass-throughs 127 are also visible.

In the embodiments illustrated in FIG. 3A and FIG. 3B, the frame 132 can be a square having a length and width of about 10 inches×10 inches. The mesh 120 can be a 325 mesh made from stainless steel. The wires of the mesh have a 30 degree bias with respect to the frame. The emulsion 134 has a thickness of about 1 mil (0.0254 mm).

Figure 4A:
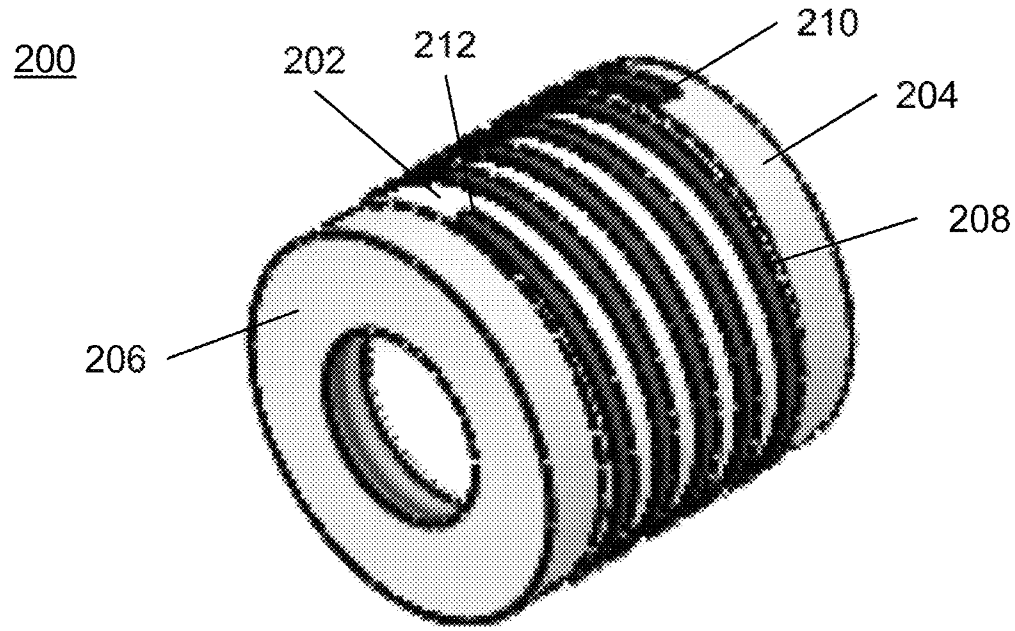
FIG. 4A is a perspective view of an integral resistance heater having a tubular body.
Figure 4B:
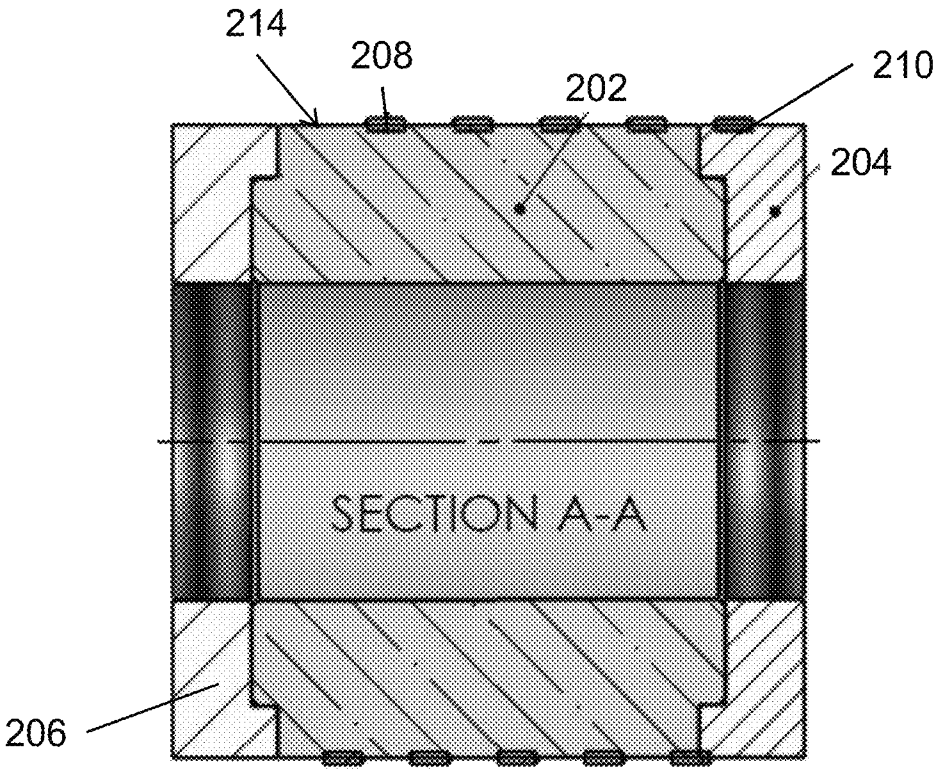
FIG. 4B is a cross-sectional side view of the tubular heater shown in FIG. 4A.

FIG. 4A and FIG. 4B illustrate an exemplary integral resistance heater 200 having a BeO ceramic body 202 which is tubular in shape. By tubular, it is meant that there is a hollow passageway through the ceramic body, in contrast to a rod which would be solid, or put another way the tubular body can be described as a cylindrical sidewall having a first or exterior surface, and a second or interior surface. The tubular body extends between a first terminal 204 and a second terminal 206 located on opposite ends of the tubular body. In some embodiments, the first and second terminals are made from KOVAR metal or a molybdenum (Mo) metal.

These terminals can be joined to the BeO ceramic body by one of soldering, brazing, or tack welding. A heating element 208 is present on the exterior surface 214 of the BeO ceramic body. The heating element can have a helical shape extending the length of the tubular BeO ceramic body. The heating element is connected to the first terminal 204 at a first end 210 and to the second terminal 206 at a second end 212.

Figure 4C:
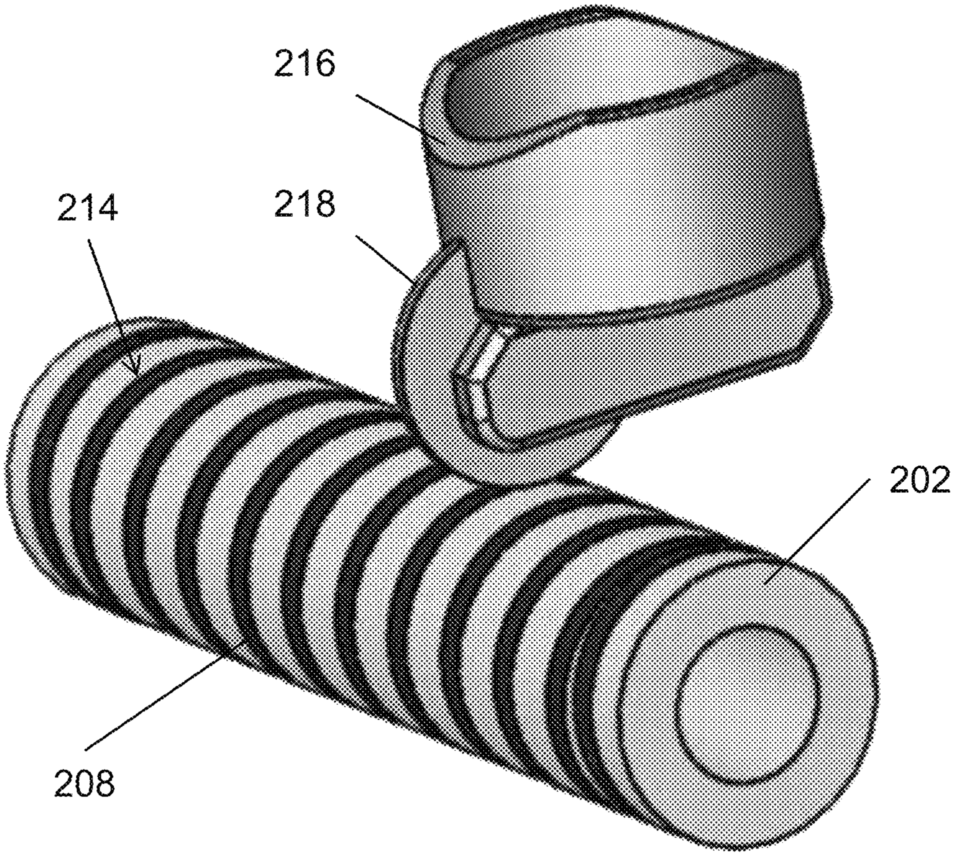
FIG. 4C is a perspective view of the tubular heater shown in FIG. 4A illustrating the application of metallizing paint for forming a heating element.

Some aspects of the integral resistance heater in FIG. 4A can be seen more clearly in the cross-sectional view illustrated in FIG. 4B. In particular, the BeO ceramic body 202 forms the sidewall, but the terminals 204, 206 form the ends of the resistance heater. Put another way, caps of KOVAR metal or molybdenum metal are placed on the ends of the BeO ceramic body, and joined by one of soldering, brazing or tack welding. In addition, the exterior surface 214 of the BeO ceramic body includes channels in which the heating element 208 is formed. As shown in FIG. 4C, the metallizing paint which forms the heating element 208 is applied by roll coating via a pinstriping applicator 216. The applicator 216 has a wheel 218 loaded with a reservoir in direct contact with the BeO surface 214. The BeO ceramic body 202 can be rotated on a spindle (not shown) to draw the paint from the pinstriping applicator wheel via surface tension.

FIG. 5 shows a heater pack incorporating the integral resistance heaters previously described. The heater pack generally includes a top plate 150, intermediate BeO ceramic body 102, first heating element 108, and base plate 152. The BeO ceramic body 102 is disposed between the top plate and the base plate, and has a first surface 104 and a second surface 106. The first heating element 108 is shown here as being printed onto the first surface of the BeO ceramic body. The first surface 104 is adjacent the base plate 152, and the second surface 106 is adjacent the top plate 150. The second surface of the BeO ceramic body also has a heating element thereon (not visible). Heater terminals 156 extend through the base plate 152 and connect to the first heating element 108 on the first surface of the intermediate BeO ceramic body. It is noted that the same heater terminals could also extend through the intermediate ceramic body to be connected to the second heating element on the second surface, if present. However, here heater terminals 154 connect to the second heating element by solder, braze, tack weld, or mechanical screw thread. Once assembled, the heating elements are embedded between the top plate and the base plate of the heater pack. At least one power source 158 can be connected to either terminals 154, 156, or both wired in series or parallel, for controlling the heating element.

In some embodiments, the heating element is printed onto the first surface of the BeO ceramic body and a second heating element (not visible) is printed onto the second surface to form a dual-zone integral resistance heater. In this regard, the first heating element can be printed using the first screen 122 shown in FIG. 3A. The optional second heating element can be printed using the second screen 124 shown in FIG. 3B.

Second heater terminals 154 are included here when the heater pack incorporates a dual-zone integral resistance heater. The second heater terminals extend through the base plate, also extend through the intermediate body itself, and connect to the second heating element on the second surface 106 of the intermediate BeO ceramic body by any suitable means such as solder, braze, tack weld, or mechanical screw thread. Power source 158 can also be used to control the second heating element via the second heater terminals. Optionally, a second power source (not shown) can be used to control the second heating element via the second heating terminals. The power sources may independently or cooperatively provide a voltage to the heater element(s).

A controller (not shown) may also be included to modulate the voltage signals provided by the power sources and may further convert analog to digital signals for readout on a display means (not shown). Display means may include an LCD, computer monitor, tablet or mobile reader device, and other display means as known by one having ordinary skill in the art. A single, multiple, or redundant thermocouple(s) are in direct surface contact at a desired location on the device, providing a closed loop feedback signal to the controller.

In some embodiments, the top plate 150 is comprised of a layer of ceramic semiconducting material, an electrode layer, and a ceramic BeO layer. The ceramic semiconducting material may include beryllium oxide (BeO) which is doped with titanium dioxide, or titania (TiO2). The layer of ceramic semiconducting material may also include a minor amount of glass eutectic which serves as an adhesive bond, and/or hermetic sealing encapsulation during sintering.

In further embodiments, the base plate 152 may be comprised of a beryllium oxide BeO ceramic layer, similar to the intermediate BeO ceramic body 102. The base plate can include includes holes 162 for the connection to the first heating element via first heating terminals and holes 160 for connection to the second heating element via second heating terminals.

Figure 6:
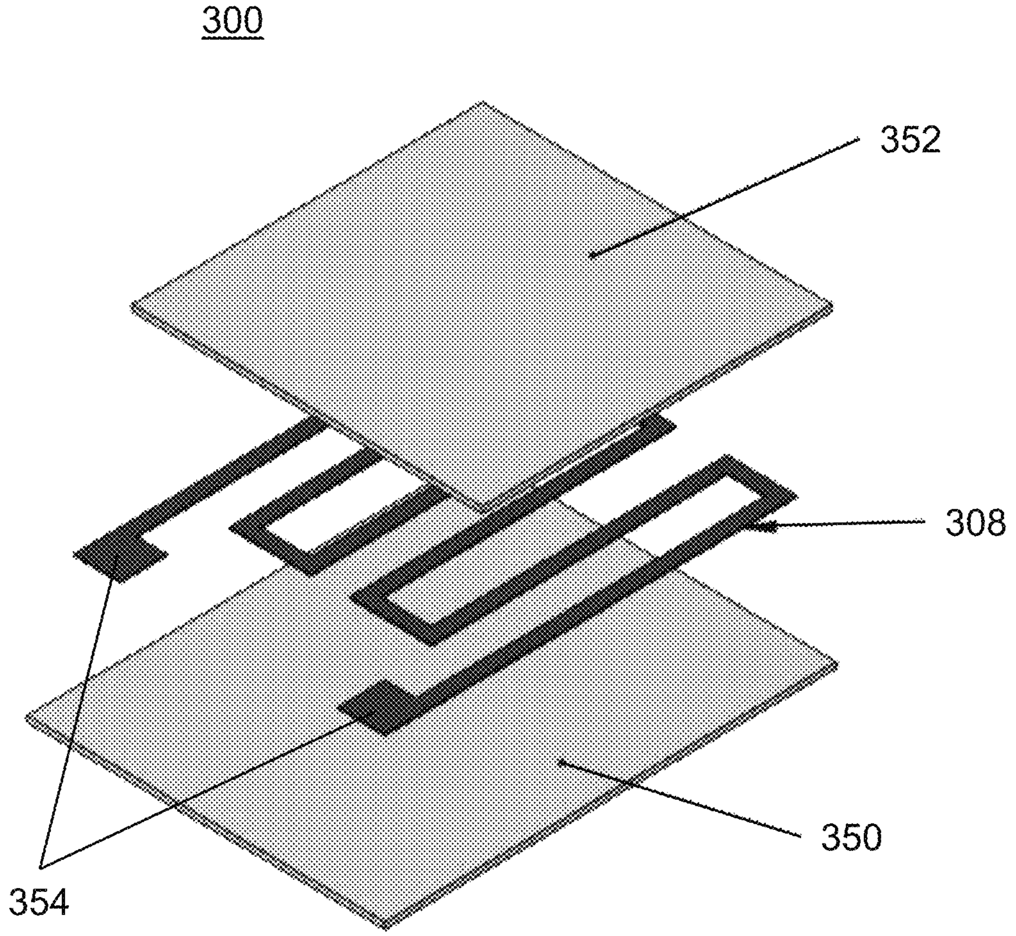
FIG. 6 is a 3D model of the components of a heater pack including an integral resistance heater according to a second aspect of the present disclosure.

With reference to FIG. 6, a heater pack 300 is shown incorporating an integral resistance heater according to a second aspect of the present disclosure. The heater pack generally includes a top plate 350, a heating element 308, and a base plate 352. The heating element also includes two ends 354 to which heater terminals are connected. The top plate can include a layer of ceramic semiconducting material, an electrode layer, and a ceramic BeO layer similar to top plate 150 of FIG. 5. The base plate can be a beryllium oxide BeO ceramic layer, similar to base plate 152 of FIG. 5. Heater terminals (not shown) can extend through the base plate to connect to the heating element ends 354. The heater pack can also include a power source (not shown) for controlling the heating element via the heater terminals, applying Ohm's law, and its Voltage Alternating Current (VAC) equivalent form $P(t)=I(t)V(t)$.

Here, the heating element 308 is a foil or thin film layer having a general zigzag pattern formed by any suitable method such as etching, die cutting, water jet, or laser cutting. In some embodiments, the heating element 308 may be a foil made from one of a nickel-cobalt ferrous alloy (e.g., KOVAR), molybdenum (Mo), tungsten (W), platinum (Pt), or a platinum-rhodium (PtRh) alloy. The heating element 308 is directly bonded to the surface of the BeO via gas/metal eutectic bond using precisely controlled temperature to produce a transient liquid phase. In other embodiments, the heating element is a thin film containing molybdenum and deposited using a physical vapor deposition (PVD) process (e.g., sputter deposition, vacuum evaporation, or so forth).

EXAMPLES

Example 1

A heating element having a resistance of about 4.5 ohms and formed from metallizing paint was embedded 0.040" below the surface of a 2 inch×2 inch BeO ceramic square plate. A voltage of about 6.5 vdc was applied to the heating element. The heating element drew a current of about 1.44 amps and output about 9W of power. The BeO ceramic plate felt warm to the touch.

Example 2

A dual-zone heating element formed from metallizing paint was embedded inside a BeO disc having a diameter of about 200 mm (7.5"). The first zone is located about 0.068" below the surface, and the second zone is located about 0.136" below the surface. The first zone heating element was powered and reached an output of about 501W of power at about 282° C. The second zone heating element was then powered, and the first zone heating element dropped to about 418W of power. The second zone heating element reached an output of about 354W of power at about 458° C. The heating elements exhibited a high temperature resistance coefficient.

Example 3

A voltage range of about 6VAC to 60VAC was applied to the heating element from Example 1 above. The heating element had a starting resistance of 4.2 ohms and the room temperature was 76° F. At about 60VAC, the heating element reached a maximum temperature of about 592° C. and power output of about 228W, respectively. The results are shown below in Table 1.

TABLE 1

Heating Test for 2" × 2" BeO Heater.

| Applied Voltage (VAC) | Current (A) | Resistance (Ω) | Temp. (° C.) | Actual Wattage (W) |
|---|---|---|---|---|
| 6 | 1.4 | 4.3 | 60 | 8.4 |
| 12 | 2 | 6.0 | 80 | 24 |
| 12 | 1.9 | 6.3 | 90 | 22.8 |
| 12 | 1.7 | 7.1 | 105 | 20.4 |
| 18 | 2.6 | 6.9 | 109 | 46.8 |
| 18 | 2.5 | 7.2 | 120 | 45 |
| 18 | 2.4 | 7.5 | 130 | 43.2 |
| 18 | 2.3 | 7.8 | 145 | 41.4 |
| 18 | 2.2 | 8.2 | 160 | 39.6 |
| 24 | 2.8 | 8.6 | 173 | 67.2 |
| 24 | 2.7 | 8.9 | 183 | 64.8 |
| 24 | 2.6 | 9.2 | 196 | 62.4 |
| 24 | 2.5 | 9.6 | 205 | 60 |
| 32 | 3.3 | 9.7 | 218 | 105.6 |
| 32 | 3.2 | 10.0 | 230 | 102.4 |
| 32 | 3.1 | 10.3 | 240 | 99.2 |
| 32 | 3 | 10.7 | 240 | 96 |
| 32 | 2.9 | 11.0 | 252 | 92.8 |
| 38 | 3.3 | 11.5 | 284 | 125.4 |
| 38 | 3.2 | 11.9 | 291 | 121.6 |
| 38 | 3.1 | 12.3 | 358 | 117.8 |
| 38 | 3 | 12.7 | 375 | 114 |
| 44 | 3.6 | 12.2 | 386 | 158.4 |
| 44 | 3.5 | 12.6 | 389 | 154 |
| 44 | 3.4 | 12.9 | 415 | 149.6 |
| End first heat test | | | | |
| Second Heat Test, moved thermocouple to different area | | | | |
| 60 | 4.6 | 13.0 | 363 | 276 |
| 60 | 4.5 | 13.3 | 375 | 270 |
| 60 | 4.4 | 13.6 | 391 | 264 |
| 60 | 4.3 | 14.0 | 510 | 258 |
| 60 | 4.2 | 14.3 | 541 | 252 |
| 60 | 4.1 | 14.6 | 555 | 246 |
| 60 | 4 | 15.0 | 564 | 240 |
| 60 | 3.9 | 15.4 | 580 | 234 |
| 60 | 3.8 | 15.8 | 592 | 228 |

Figure 7:
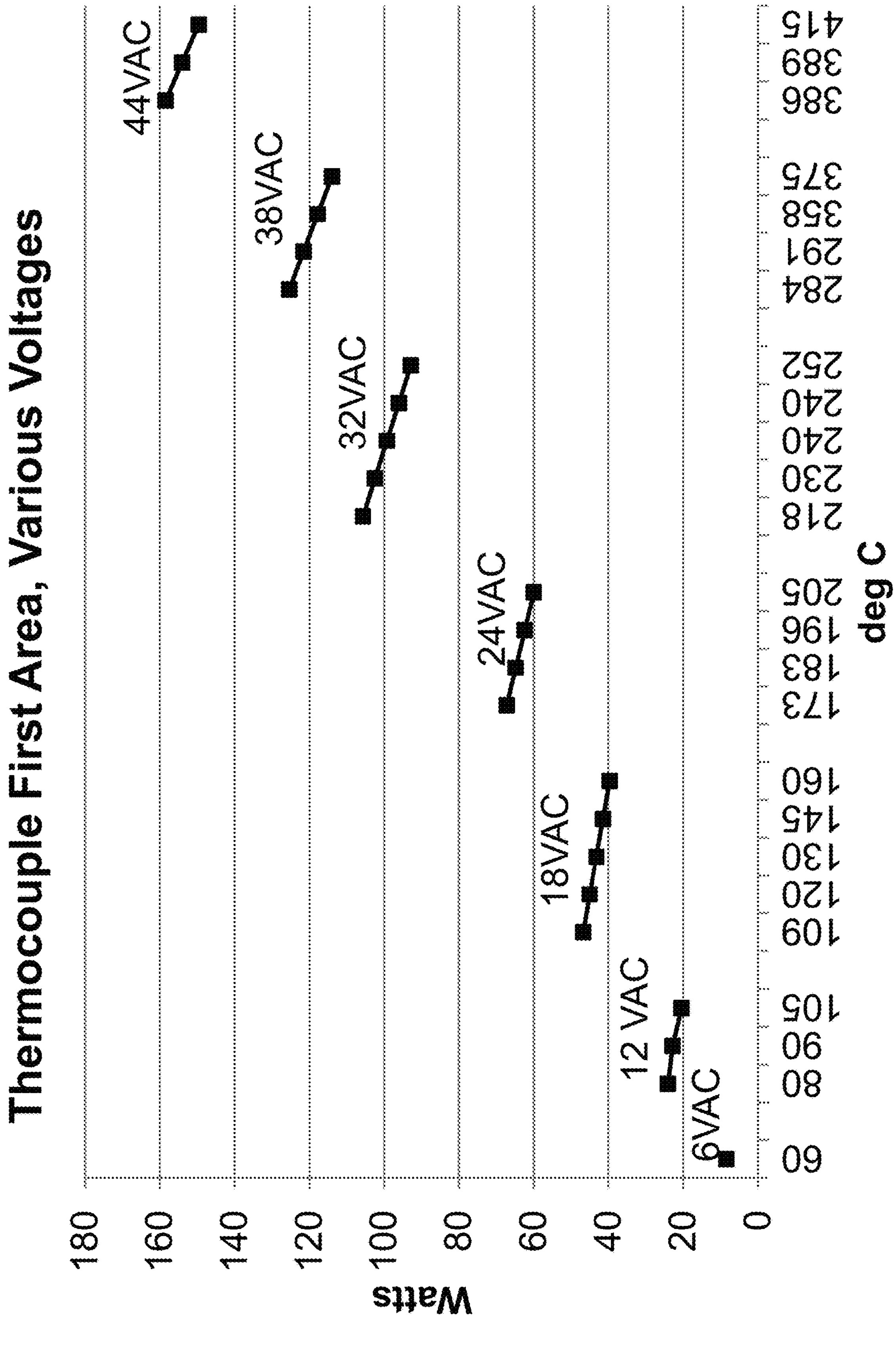
FIG. 7 is a chart showing actual wattage versus temperature for a voltage of about 6VAC to about 44VAC applied to an integral resistance heater according to the present disclosure.
Figure 8:
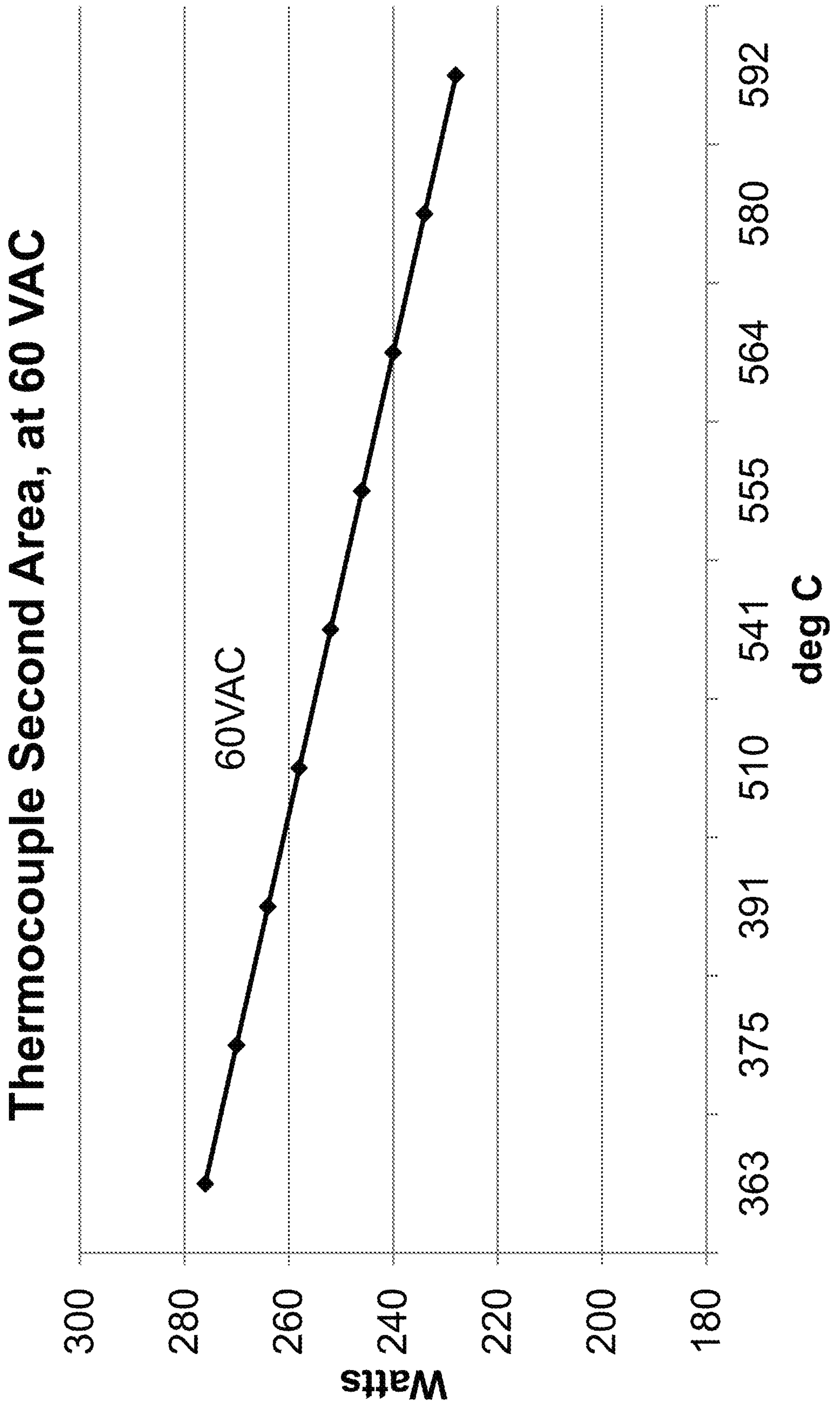
FIG. 8 is a chart showing actual wattage versus temperature for a voltage of 60VAC applied to an integral resistance heater according to the present disclosure.
Figure 9:
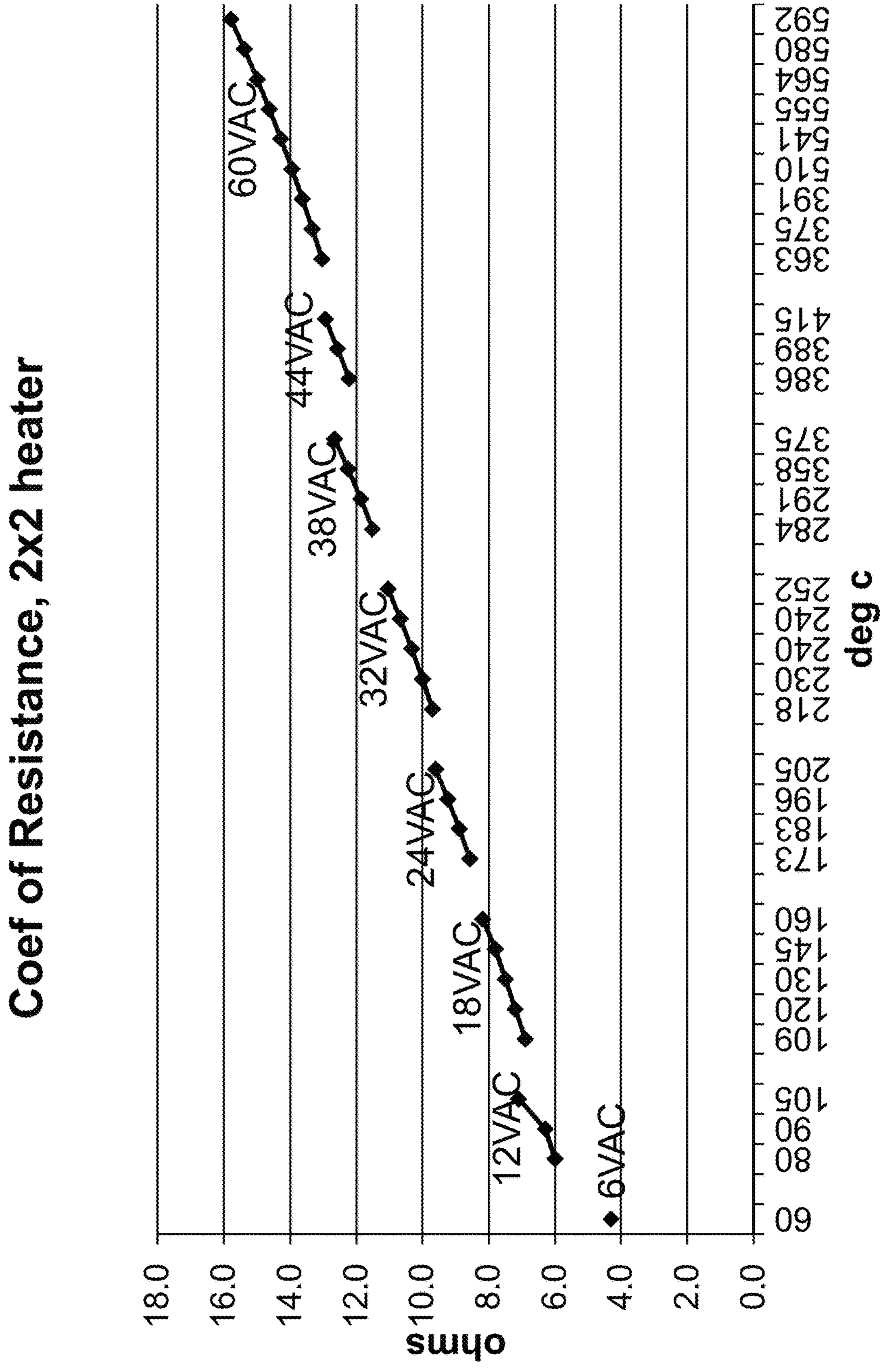
FIG. 9 is a chart showing resistance versus temperature for a voltage of about 6VAC to about 44VAC applied to an integral resistance heater according to the present disclosure.

In FIGS. 7-9, actual wattage (W), resistance (ohms, Ω), and temperature (° C.) were plotted for the applied voltages of about 6VAC to about 60VAC from Table 1. As seen in FIG. 7, input voltages of about 6VAC, 12VAC, 18VAC, 24VAC, 32VAC, 38VAC, and 44VAC were plotted. The maximum temperatures at these input voltages were about 60° C., 105° C., 160° C., 205° C., 250° C., 375° C., and 415° C., respectively. The maximum power output at these input voltages was about 8W, 24W, 47W, 67W, 106W, 125W, and 158W, respectively. In FIG. 8, the thermocouple was moved to a different area and actual wattage (W) and temperature (° C.) were plotted for the applied voltage of 60VAC. The maximum temperature was about 592° C. and the maximum power output was about 276W. In FIG. 9, the coefficient of resistance (ohms, Ω) and temperature (° C.) was plotted for the applied voltages from Table 1, FIG. 7, and FIG. 8. The highest resistance at the input voltages of 6VAC, 12VAC, 18VAC, 24VAC, 32VAC, 38VAC, 44VAC, and 60VAC was about 4Ω, 7Ω, 8Ω, 10Ω, 11Ω, 13Ω, 13Ω, and 16Ω respectively.

Example 4

Power was supplied to the dual-zone heating element described according to Example 2 above. A voltage range of about 7VAC to 121VAC was applied in two tests, at the first and second zones. A starting resistance for zone 1, test 1 was about 17.8Ω. Starting resistance for zone 2, test 1 was about 5.9Ω. At zone 1, test 2, the starting resistance was about 20.9Ω. Finally, the starting resistance for zone 2, test 2 was about 7.4Ω. The results of the two tests at the first and second zones are shown below in Tables 2-5.

TABLE 2

Heating Test for a Dual-Zone BeO Disc Heater, Zone 1, Test 1

| Zone 1 test 1 Applied Voltage (VAC) | Zone 1 test 1 Current (A) | Zone 1 test 1 Resistance (Ohms) | Zone 1 test 1 Temp (° C.) | Zone 1 test 1 Actual Watts (W) |
|---|---|---|---|---|
| 39.4 | 2.2 | 17.8 | 60 | 87 |
| 39.6 | 2.2 | 17.9 | 62 | 88 |
| 39.8 | 2.2 | 18 | 65 | 88 |
| 40.1 | 2.2 | 18.1 | 67 | 89 |
| 40.4 | 2.2 | 18.2 | 69 | 90 |
| 40.8 | 2.2 | 18.4 | 71 | 90 |
| 40.4 | 2.2 | 18.2 | 73 | 89 |
| 45.7 | 2.5 | 18.4 | 76 | 113 |
| 46.3 | 2.5 | 18.6 | 78 | 115 |
| 45.7 | 2.5 | 18.4 | 80 | 114 |
| 46.5 | 2.5 | 18.7 | 83 | 115 |
| 47.1 | 2.5 | 18.9 | 85 | 117 |
| 46.9 | 2.5 | 18.9 | 88 | 116 |
| 47.4 | 2.5 | 19.1 | 91 | 118 |
| 48.2 | 2.5 | 19.4 | 93 | 119 |
| 48.1 | 2.5 | 19.4 | 96 | 120 |
| 53.5 | 2.7 | 19.6 | 98 | 146 |
| 53.7 | 2.7 | 19.7 | 101 | 147 |
| 54.3 | 2.7 | 20 | 104 | 148 |
| 54.7 | 2.7 | 20.1 | 107 | 149 |
| 54.8 | 2.7 | 20.1 | 110 | 149 |
| 55.7 | 2.7 | 20.4 | 113 | 152 |
| 55.4 | 2.7 | 20.4 | 116 | 151 |
| 56.8 | 2.7 | 20.9 | 118 | 155 |
| 56.6 | 2.7 | 20.8 | 121 | 155 |
| 56.7 | 2.7 | 20.8 | 124 | 155 |
| 57.3 | 2.7 | 21 | 127 | 157 |
| 57.9 | 2.7 | 21.2 | 129 | 158 |
| 57.8 | 2.7 | 21.2 | 132 | 158 |
| 58.1 | 2.7 | 21.3 | 134 | 159 |
| 61.7 | 2.9 | 21.6 | 137 | 176 |
| 61.8 | 2.9 | 21.6 | 140 | 177 |

TABLE 2-continued

Heating Test for a Dual-Zone BeO Disc Heater, Zone 1, Test 1

| Zone 1 test 1 Applied Voltage (VAC) | Zone 1 test 1 Current (A) | Zone 1 test 1 Resistance (Ohms) | Zone 1 test 1 Temp (° C.) | Zone 1 test 1 Actual Watts (W) |
|---|---|---|---|---|
| 62.7 | 2.9 | 21.9 | 142 | 179 |
| 67.2 | 3 | 22.1 | 145 | 204 |
| 66.5 | 3 | 21.9 | 148 | 202 |
| 67.4 | 3 | 22.2 | 151 | 205 |
| 68.1 | 3 | 22.5 | 154 | 206 |
| 68.7 | 3 | 22.7 | 157 | 208 |
| 68.9 | 3 | 22.6 | 161 | 209 |
| 69.1 | 3 | 22.8 | 164 | 209 |
| 69.6 | 3 | 22.9 | 166 | 212 |
| 70.6 | 3 | 23.2 | 169 | 215 |
| 71.3 | 3 | 23.5 | 172 | 217 |
| 71.6 | 3 | 23.6 | 175 | 217 |
| 71.3 | 3 | 23.5 | 178 | 216 |
| 72.5 | 3 | 23.9 | 180 | 220 |
| 72.3 | 3 | 23.8 | 183 | 219 |
| 73.3 | 3 | 24.2 | 185 | 222 |
| 73.4 | 3 | 24.2 | 187 | 222 |
| 74.3 | 3 | 24.5 | 190 | 226 |
| 74.4 | 3 | 24.5 | 192 | 226 |
| 74.4 | 3 | 24.5 | 194 | 226 |
| 75.3 | 3 | 24.8 | 196 | 228 |
| 75 | 3 | 24.7 | 198 | 227 |
| 76 | 3 | 25 | 200 | 231 |
| 75.9 | 3 | 25 | 202 | 230 |
| 76.2 | 3 | 25 | 204 | 231 |
| 76.5 | 3 | 25.1 | 206 | 232 |
| 76.4 | 3 | 25.2 | 208 | 232 |
| 77.2 | 3 | 25.4 | 210 | 235 |
| 77.3 | 3 | 25.5 | 211 | 234 |
| 78.1 | 3 | 25.6 | 213 | 237 |
| 77.4 | 3 | 25.5 | 214 | 234 |
| 77.9 | 3 | 25.6 | 216 | 237 |
| 77.7 | 3 | 25.6 | 217 | 236 |
| 78.6 | 3 | 25.9 | 219 | 239 |
| 79.3 | 3 | 26.1 | 220 | 241 |
| 79.2 | 3 | 26.1 | 222 | 240 |
| 78.6 | 3 | 25.9 | 223 | 239 |
| 79.7 | 3 | 26.2 | 224 | 242 |
| 79.8 | 3 | 26.3 | 225 | 242 |
| 79.7 | 3 | 26.3 | 227 | 242 |
| 80.4 | 3 | 26.5 | 228 | 244 |
| 79.8 | 3 | 26.3 | 229 | 242 |
| 80.2 | 3 | 26.4 | 230 | 243 |
| 80.8 | 3 | 26.6 | 231 | 246 |
| 80.8 | 3 | 26.6 | 232 | 246 |
| 80.9 | 3 | 26.6 | 233 | 246 |
| 84.6 | 3.2 | 26.5 | 234 | 270 |
| 85.4 | 3.2 | 26.7 | 235 | 273 |
| 85.2 | 3.2 | 26.6 | 237 | 273 |
| 86.4 | 3.2 | 26.7 | 238 | 277 |
| 86 | 3.2 | 26.9 | 240 | 275 |
| 86.6 | 3.2 | 27.1 | 242 | 277 |
| 86.3 | 3.2 | 27 | 243 | 276 |
| 89.3 | 3.3 | 27.3 | 245 | 293 |
| 89.7 | 3.3 | 27.4 | 246 | 293 |
| 89.9 | 3.3 | 27.5 | 248 | 294 |
| 89.9 | 3.3 | 27.4 | 250 | 295 |
| 90.2 | 3.3 | 27.5 | 252 | 296 |
| 90 | 3.3 | 27.5 | 253 | 294 |
| 90.9 | 3.3 | 27.8 | 255 | 298 |
| 91 | 3.3 | 27.8 | 257 | 298 |
| 91.8 | 3.3 | 28 | 258 | 300 |
| 91 | 3.3 | 27.8 | 260 | 298 |
| 92.3 | 3.3 | 28.2 | 261 | 303 |
| 91.9 | 3.3 | 28.1 | 263 | 301 |
| 91.9 | 3.3 | 28.1 | 264 | 302 |
| 92.1 | 3.3 | 28.1 | 265 | 301 |
| 92.6 | 3.3 | 28.3 | 267 | 304 |
| 93.3 | 3.3 | 28.5 | 268 | 305 |
| 93.4 | 3.3 | 28.5 | 269 | 306 |
| 96.2 | 3.4 | 28.3 | 270 | 326 |
| 96.8 | 3.4 | 28.6 | 272 | 327 |
| 97.4 | 3.4 | 28.8 | 273 | 330 |

TABLE 2-continued

Heating Test for a Dual-Zone BeO Disc Heater, Zone 1, Test 1

| Zone 1 test 1 Applied Voltage (VAC) | Zone 1 test 1 Current (A) | Zone 1 test 1 Resistance (Ohms) | Zone 1 test 1 Temp (° C.) | Zone 1 test 1 Actual Watts (W) |
|---|---|---|---|---|
| 97.2 | 3.4 | 28.7 | 275 | 330 |
| 99.7 | 3.5 | 28.8 | 277 | 345 |
| 99.9 | 3.5 | 28.9 | 278 | 346 |
| 100.5 | 3.5 | 29 | 280 | 348 |
| 100.3 | 3.5 | 29.2 | 282 | 347 |
| 101.3 | 3.5 | 29.2 | 284 | 350 |
| 102.1 | 3.5 | 29.5 | 286 | 354 |
| 102.4 | 3.5 | 29.6 | 287 | 354 |
| 102.2 | 3.5 | 29.5 | 289 | 354 |
| 102.5 | 3.5 | 29.6 | 291 | 355 |
| 103 | 3.5 | 29.7 | 292 | 356 |
| 103.2 | 3.5 | 29.8 | 294 | 357 |
| 103.7 | 3.5 | 29.9 | 295 | 359 |
| 103.8 | 3.5 | 30 | 297 | 359 |
| 103.8 | 3.5 | 30 | 298 | 359 |
| 103.9 | 3.5 | 30 | 299 | 360 |
| 104.5 | 3.5 | 30.1 | 301 | 361 |
| 103.9 | 3.5 | 30.3 | 302 | 359 |
| 104.4 | 3.5 | 30.1 | 303 | 362 |
| 104.7 | 3.5 | 30.2 | 304 | 362 |
| 105.4 | 3.5 | 30.4 | 305 | 365 |
| 105.8 | 3.5 | 30.5 | 306 | 367 |
| 105.1 | 3.5 | 30.3 | 307 | 364 |
| 105.1 | 3.5 | 30.4 | 308 | 364 |
| 105.7 | 3.5 | 30.5 | 309 | 367 |
| 107.8 | 3.5 | 30.5 | 310 | 382 |

TABLE 3

Heating Test for a Dual-Zone BeO Disc Heater, Zone 2, Test 1

| Zone 2 test 1 Applied Voltage (VAC) | Zone 2 test 1 Current (A) | Zone 2 test 1 Resistance (Ohms) | Zone 2 test 1 Temp (° C.) | Zone 2 test 1 Actual Watts (W) |
|---|---|---|---|---|
| 20.9 | 3.5 | 5.9 | 60 | 74 |
| 20.7 | 3.5 | 5.8 | 62 | 73 |
| 21.7 | 3.6 | 6.1 | 65 | 77 |
| 21.1 | 3.5 | 5.9 | 67 | 75 |
| 21.2 | 3.5 | 6 | 69 | 75 |
| 21.4 | 3.5 | 6 | 71 | 76 |
| 21.8 | 3.5 | 6.2 | 73 | 77 |
| 24.4 | 4 | 6.1 | 76 | 97 |
| 24.9 | 4 | 6.3 | 78 | 99 |
| 25.1 | 4 | 6.3 | 80 | 100 |
| 25.1 | 4 | 6.3 | 83 | 100 |
| 25.2 | 4 | 6.3 | 85 | 100 |
| 25.6 | 4 | 6.4 | 88 | 102 |
| 25 | 4 | 6.5 | 91 | 100 |
| 26.1 | 4 | 6.5 | 93 | 104 |
| 26.3 | 4 | 6.6 | 96 | 105 |
| 28 | 4.4 | 6.4 | 98 | 122 |
| 28.1 | 4.4 | 6.4 | 101 | 123 |
| 29.1 | 4.3 | 6.7 | 104 | 127 |
| 29.3 | 4.4 | 6.7 | 107 | 128 |
| 29.5 | 4.3 | 6.8 | 110 | 128 |
| 30.1 | 4.4 | 6.9 | 113 | 132 |
| 29.6 | 4.4 | 6.8 | 116 | 129 |
| 29.9 | 4.4 | 6.8 | 118 | 131 |
| 30.4 | 4.3 | 7 | 121 | 132 |
| 30.2 | 4.4 | 6.9 | 124 | 132 |
| 30.8 | 4.4 | 7 | 127 | 135 |
| 31.3 | 4.4 | 7.2 | 129 | 136 |
| 30.9 | 4.4 | 7.1 | 132 | 135 |
| 31 | 4.4 | 7.1 | 134 | 136 |
| 32.9 | 4.6 | 7.2 | 137 | 151 |
| 33.3 | 4.6 | 7.3 | 140 | 153 |
| 33.5 | 4.6 | 7.3 | 142 | 153 |
| 35.3 | 4.9 | 7.2 | 145 | 173 |

TABLE 3-continued

Heating Test for a Dual-Zone BeO Disc Heater, Zone 2, Test 1

| Zone 2 test 1 Applied Voltage (VAC) | Zone 2 test 1 Current (A) | Zone 2 test 1 Resistance (Ohms) | Zone 2 test 1 Temp (° C.) | Zone 2 test 1 Actual Watts (W) |
|---|---|---|---|---|
| 35.6 | 4.9 | 7.3 | 148 | 173 |
| 35.9 | 4.9 | 7.4 | 151 | 175 |
| 35.7 | 4.9 | 7.3 | 154 | 173 |
| 36.1 | 4.9 | 7.4 | 157 | 175 |
| 37.2 | 4.9 | 7.6 | 161 | 181 |
| 36.7 | 4.9 | 7.6 | 164 | 179 |
| 37.5 | 4.9 | 7.7 | 166 | 182 |
| 37.2 | 4.8 | 7.7 | 169 | 180 |
| 37.7 | 4.9 | 7.7 | 172 | 183 |
| 38.4 | 4.8 | 7.9 | 175 | 186 |
| 37.6 | 4.8 | 7.9 | 178 | 182 |
| 38.4 | 4.9 | 7.9 | 180 | 187 |
| 38.1 | 4.8 | 7.8 | 183 | 185 |
| 38.4 | 4.8 | 7.9 | 185 | 186 |
| 38.7 | 4.9 | 8 | 187 | 188 |
| 39.2 | 4.8 | 8.1 | 190 | 190 |
| 39.2 | 4.9 | 8.1 | 192 | 191 |
| 39.5 | 4.8 | 8.1 | 194 | 191 |
| 39.6 | 4.8 | 8.2 | 196 | 192 |
| 39.2 | 4.8 | 8.1 | 198 | 190 |
| 39.9 | 4.9 | 8.2 | 200 | 194 |
| 40.1 | 4.8 | 8.2 | 202 | 194 |
| 39.6 | 4.8 | 8.2 | 204 | 192 |
| 40.9 | 4.9 | 8.4 | 206 | 200 |
| 40.7 | 4.9 | 8.4 | 208 | 198 |
| 40.7 | 4.9 | 8.4 | 210 | 198 |
| 40.3 | 4.8 | 8.5 | 211 | 195 |
| 40.6 | 4.9 | 8.3 | 213 | 198 |
| 41.6 | 4.9 | 8.6 | 214 | 202 |
| 41.3 | 4.9 | 8.5 | 216 | 201 |
| 41.7 | 4.9 | 8.6 | 217 | 203 |
| 41.2 | 4.9 | 8.5 | 219 | 200 |
| 41.4 | 4.9 | 8.5 | 220 | 202 |
| 41.4 | 4.8 | 8.5 | 222 | 201 |
| 41.9 | 4.9 | 8.6 | 223 | 203 |
| 41.6 | 4.9 | 8.6 | 224 | 202 |
| 42 | 4.8 | 8.6 | 225 | 204 |
| 42.3 | 4.9 | 8.7 | 227 | 205 |
| 41.8 | 4.8 | 8.6 | 228 | 203 |
| 42.7 | 4.9 | 8.8 | 229 | 208 |
| 42.3 | 4.9 | 8.7 | 230 | 206 |
| 42.5 | 4.9 | 8.7 | 231 | 207 |
| 42.2 | 4.9 | 8.7 | 232 | 205 |
| 42.5 | 4.9 | 8.7 | 233 | 207 |
| 44.3 | 5.1 | 8.7 | 234 | 226 |
| 44.9 | 5.1 | 8.8 | 235 | 229 |
| 45.1 | 5.1 | 8.8 | 237 | 231 |
| 45.6 | 5.1 | 8.9 | 238 | 234 |
| 45.9 | 5.1 | 9 | 240 | 234 |
| 45.2 | 5.1 | 8.8 | 242 | 231 |
| 46.1 | 5.1 | 9 | 243 | 236 |
| 47.3 | 5.3 | 9 | 245 | 249 |
| 47.5 | 5.2 | 9.1 | 246 | 249 |
| 47 | 5.2 | 9 | 248 | 246 |
| 47.2 | 5.2 | 9 | 250 | 248 |
| 47.3 | 5.2 | 9 | 252 | 248 |
| 47.7 | 5.2 | 9.1 | 253 | 250 |
| 47.8 | 5.2 | 9.1 | 255 | 250 |
| 47.4 | 5.2 | 9 | 257 | 249 |
| 48.7 | 5.2 | 9.3 | 258 | 255 |
| 48.3 | 5.2 | 9.2 | 260 | 253 |
| 47.9 | 5.2 | 9.2 | 261 | 251 |
| 48.4 | 5.2 | 9.3 | 263 | 254 |
| 48.6 | 5.2 | 9.2 | 264 | 255 |
| 48.1 | 5.2 | 9.2 | 265 | 252 |
| 49.5 | 5.3 | 9.4 | 267 | 260 |
| 49.5 | 5.2 | 9.4 | 268 | 259 |
| 48.7 | 5.2 | 9.3 | 269 | 255 |
| 50.9 | 5.4 | 9.4 | 270 | 276 |
| 50.6 | 5.4 | 9.3 | 272 | 275 |
| 51.1 | 5.4 | 9.4 | 273 | 277 |
| 51.6 | 5.4 | 9.5 | 275 | 280 |
| 52.9 | 5.5 | 9.5 | 277 | 293 |
| 52.7 | 5.5 | 9.5 | 278 | 292 |
| 53 | 5.6 | 9.5 | 280 | 294 |
| 52.7 | 5.5 | 9.7 | 282 | 292 |
| 53.5 | 5.5 | 9.7 | 284 | 296 |
| 54 | 5.5 | 9.7 | 286 | 299 |
| 53.8 | 5.5 | 9.7 | 287 | 298 |
| 53.5 | 5.5 | 9.7 | 289 | 297 |
| 54.7 | 5.5 | 9.8 | 291 | 303 |
| 54 | 5.6 | 9.7 | 292 | 300 |
| 54 | 5.5 | 9.7 | 294 | 299 |
| 54.1 | 5.5 | 9.8 | 295 | 300 |
| 54.9 | 5.5 | 9.9 | 297 | 304 |
| 54.9 | 5.5 | 9.9 | 298 | 304 |
| 54.8 | 5.5 | 9.8 | 299 | 304 |
| 54.8 | 5.5 | 9.9 | 301 | 303 |
| 55.2 | 5.5 | 10 | 302 | 306 |
| 55.5 | 5.5 | 10 | 303 | 308 |
| 55.4 | 5.6 | 10 | 304 | 307 |
| 55 | 5.6 | 9.9 | 305 | 305 |
| 55.2 | 5.5 | 10 | 306 | 306 |
| 55.3 | 5.5 | 9.9 | 307 | 306 |
| 55.3 | 5.5 | 10 | 308 | 306 |
| 55.2 | 5.5 | 10 | 309 | 306 |
| 56.5 | 5.7 | 10 | 310 | 320 |

TABLE 4

Heating Test for a Dual-Zone BeO Disc Heater, Zone 1, Test 2

| Zone 1 test 2 Applied Voltage (VAC) | Zone 1 test 2 Current (A) | Zone 1 test 2 Resistance (Ohms) | Zone 1 test 2 Temp (° C.) | Zone 1 test 2 Actual Watts (W) |
|---|---|---|---|---|
| 12.5 | 0.6 | 20.9 | 70 | 7 |
| 12.5 | 0.6 | 21.2 | 72 | 7 |
| 14.4 | 0.7 | 21.1 | 73 | 10 |
| 20.8 | 1 | 19.8 | 74 | 22 |
| 20.1 | 1 | 20 | 75 | 21 |
| 20.8 | 1 | 19.8 | 76 | 22 |
| 20.4 | 1 | 19.5 | 77 | 21 |
| 28.6 | 1.5 | 18.6 | 78 | 44 |
| 28.9 | 1.5 | 18.8 | 79 | 45 |
| 29.2 | 1.5 | 18.9 | 80 | 45 |
| 29.1 | 1.5 | 19 | 81 | 45 |
| 29.4 | 1.5 | 19.1 | 83 | 45 |
| 29.5 | 1.5 | 19.1 | 84 | 45 |
| 37.1 | 2 | 18.9 | 85 | 73 |
| 37 | 2 | 18.8 | 87 | 73 |
| 37.6 | 2 | 19.1 | 89 | 74 |
| 38.1 | 2 | 19.4 | 91 | 75 |
| 41.4 | 2.2 | 19.1 | 93 | 90 |
| 42.3 | 2.2 | 19.1 | 96 | 94 |
| 42.4 | 2.2 | 19.1 | 98 | 94 |
| 42.9 | 2.2 | 19.4 | 101 | 95 |
| 43.6 | 2.2 | 19.7 | 104 | 96 |
| 51.7 | 2.6 | 19.6 | 106 | 136 |
| 52 | 2.6 | 19.8 | 110 | 137 |
| 52.6 | 2.6 | 20 | 114 | 139 |
| 53.9 | 2.6 | 20.5 | 118 | 142 |
| 54.2 | 2.6 | 20.6 | 122 | 143 |
| 54.7 | 2.6 | 20.8 | 126 | 144 |
| 55.5 | 2.6 | 21.1 | 129 | 147 |
| 55.8 | 2.6 | 21.2 | 133 | 147 |
| 56.3 | 2.6 | 21.4 | 137 | 148 |
| 57.7 | 2.6 | 22 | 141 | 152 |
| 57.9 | 2.6 | 21.9 | 145 | 153 |
| 58 | 2.6 | 22 | 149 | 153 |
| 58.6 | 2.6 | 22.3 | 152 | 155 |
| 59.2 | 2.6 | 22.4 | 156 | 156 |

TABLE 4-continued

Heating Test for a Dual-Zone BeO Disc Heater, Zone 1, Test 2

| Zone 1 test 2 Applied Voltage (VAC) | Zone 1 test 2 Current (A) | Zone 1 test 2 Resistance (Ohms) | Zone 1 test 2 Temp (° C.) | Zone 1 test 2 Actual Watts (W) |
|---|---|---|---|---|
| 59.4 | 2.6 | 22.6 | 160 | 156 |
| 60 | 2.6 | 22.8 | 163 | 158 |
| 61.5 | 2.6 | 23.3 | 167 | 162 |
| 61.2 | 2.6 | 23.3 | 170 | 161 |
| 62.3 | 2.6 | 23.6 | 173 | 164 |
| 62.6 | 2.6 | 23.7 | 177 | 165 |
| 63.1 | 2.6 | 24 | 180 | 166 |
| 63.2 | 2.6 | 24 | 183 | 166 |
| 64.1 | 2.6 | 24.4 | 186 | 169 |
| 64 | 2.6 | 24.3 | 190 | 168 |
| 64.6 | 2.6 | 24.5 | 193 | 170 |
| 65.9 | 2.6 | 25 | 196 | 174 |
| 65.8 | 2.6 | 25 | 199 | 174 |
| 66 | 2.6 | 25.1 | 202 | 174 |
| 66.3 | 2.6 | 25.2 | 205 | 174 |
| 67.2 | 2.6 | 25.6 | 208 | 177 |
| 67.1 | 2.6 | 25.5 | 211 | 177 |
| 68.2 | 2.6 | 25.9 | 213 | 179 |
| 68.1 | 2.6 | 25.9 | 216 | 179 |
| 68.4 | 2.6 | 26 | 219 | 180 |
| 68.9 | 2.6 | 26.2 | 221 | 181 |
| 72.2 | 2.7 | 26.5 | 224 | 196 |
| 71.8 | 2.7 | 26.4 | 227 | 196 |
| 72.6 | 2.7 | 26.6 | 230 | 198 |
| 73.4 | 2.7 | 26.9 | 233 | 200 |
| 73.7 | 2.7 | 27 | 235 | 201 |
| 74 | 2.7 | 27.1 | 238 | 202 |
| 74.4 | 2.7 | 27.2 | 241 | 202 |
| 74.3 | 2.7 | 27.3 | 244 | 203 |
| 75.4 | 2.7 | 27.6 | 247 | 205 |
| 76 | 2.7 | 27.9 | 249 | 207 |
| 76.2 | 2.7 | 28 | 252 | 208 |
| 76.5 | 2.7 | 28.1 | 255 | 209 |
| 76 | 2.7 | 27.9 | 257 | 207 |
| 77.2 | 2.7 | 28.3 | 260 | 211 |
| 77.7 | 2.7 | 28.4 | 262 | 212 |
| 77.6 | 2.7 | 28.4 | 265 | 212 |
| 77.6 | 2.7 | 28.8 | 267 | 211 |
| 82.2 | 2.9 | 28.7 | 270 | 235 |
| 82.6 | 2.9 | 28.8 | 272 | 236 |
| 83.2 | 2.9 | 29 | 275 | 238 |
| 84.3 | 2.9 | 29.4 | 278 | 241 |
| 83.8 | 2.9 | 29.3 | 280 | 240 |
| 84.4 | 2.9 | 29.5 | 283 | 241 |
| 84.6 | 2.9 | 29.6 | 286 | 242 |
| 85.5 | 2.9 | 29.8 | 289 | 245 |
| 85.9 | 2.9 | 30 | 292 | 247 |
| 86.5 | 2.9 | 30.2 | 294 | 248 |
| 86.3 | 2.9 | 30.1 | 297 | 248 |
| 87.6 | 2.9 | 30.5 | 299 | 251 |
| 87.6 | 2.9 | 30.6 | 302 | 251 |
| 88.4 | 2.9 | 30.8 | 305 | 253 |
| 88.6 | 2.9 | 30.9 | 307 | 253 |
| 88.2 | 2.9 | 30.8 | 309 | 252 |
| 90.6 | 2.9 | 31.1 | 312 | 263 |
| 91.1 | 2.9 | 31.4 | 314 | 265 |
| 90.6 | 2.9 | 31.2 | 317 | 263 |
| 91.8 | 2.9 | 31.6 | 319 | 266 |
| 91.8 | 2.9 | 31.6 | 321 | 267 |
| 92.5 | 2.9 | 31.9 | 324 | 268 |
| 93.1 | 2.9 | 32 | 326 | 271 |
| 92.8 | 2.9 | 32 | 328 | 269 |
| 95.7 | 3 | 32 | 331 | 286 |
| 96.2 | 3 | 32.1 | 333 | 288 |
| 97.2 | 3 | 32.4 | 336 | 291 |
| 97.8 | 3 | 32.7 | 338 | 293 |
| 98.3 | 3 | 32.8 | 341 | 295 |
| 98.5 | 3 | 32.9 | 344 | 294 |
| 99.1 | 3 | 33.1 | 346 | 296 |
| 99 | 3 | 33 | 348 | 297 |
| 99.8 | 3 | 33.4 | 351 | 298 |
| 99.6 | 3 | 33.3 | 353 | 299 |
| 100.4 | 3 | 33.5 | 356 | 301 |

TABLE 4-continued

Heating Test for a Dual-Zone BeO Disc Heater, Zone 1, Test 2

| Zone 1 test 2 Applied Voltage (VAC) | Zone 1 test 2 Current (A) | Zone 1 test 2 Resistance (Ohms) | Zone 1 test 2 Temp (° C.) | Zone 1 test 2 Actual Watts (W) |
|---|---|---|---|---|
| 101.1 | 3 | 33.8 | 358 | 303 |
| 101.1 | 3 | 33.8 | 360 | 303 |
| 102 | 3 | 34.1 | 362 | 305 |
| 101.3 | 3 | 33.8 | 365 | 303 |
| 101.6 | 3 | 34 | 367 | 304 |
| 102.8 | 3 | 34.4 | 369 | 307 |
| 106 | 3.1 | 34.5 | 371 | 326 |
| 105.7 | 3.1 | 34.4 | 373 | 324 |
| 106.3 | 3.1 | 34.5 | 376 | 326 |
| 106.3 | 3.1 | 34.6 | 378 | 327 |
| 107.8 | 3.1 | 35 | 381 | 331 |
| 107.3 | 3.1 | 34.9 | 383 | 329 |
| 108 | 3.1 | 35 | 385 | 333 |
| 108.5 | 3.1 | 35.3 | 388 | 333 |
| 108.8 | 3.1 | 35.4 | 390 | 335 |
| 108.4 | 3.1 | 35.3 | 392 | 333 |
| 110 | 3.1 | 35.7 | 394 | 339 |
| 109.3 | 3.1 | 35.9 | 396 | 337 |
| 110.5 | 3.1 | 35.8 | 399 | 339 |
| 98.7 | 3.1 | 32.1 | 349 | 303 |
| 99.8 | 3.1 | 32.4 | 346 | 308 |
| 100.3 | 3.1 | 32.5 | 347 | 309 |
| 101.4 | 3.1 | 32.9 | 349 | 312 |
| 101.9 | 3.1 | 33.1 | 352 | 313 |
| 102.5 | 3.1 | 33.2 | 355 | 316 |
| 102.5 | 3.1 | 33.3 | 358 | 315 |
| 103.5 | 3.1 | 33.6 | 361 | 318 |
| 110.4 | 3.3 | 33.7 | 364 | 361 |
| 111.6 | 3.3 | 34 | 368 | 365 |
| 112.1 | 3.3 | 34.3 | 372 | 367 |
| 112.6 | 3.3 | 34.4 | 376 | 368 |
| 114 | 3.3 | 34.9 | 380 | 373 |
| 114.6 | 3.3 | 35 | 384 | 376 |
| 115.4 | 3.3 | 35.2 | 388 | 379 |
| 115.7 | 3.3 | 35.3 | 391 | 380 |
| 116.2 | 3.3 | 35.5 | 395 | 381 |
| 117.4 | 3.3 | 35.9 | 399 | 384 |
| 117.9 | 3.3 | 36 | 402 | 387 |
| 118.6 | 3.3 | 36.2 | 406 | 389 |
| 119.4 | 3.3 | 36.5 | 409 | 392 |
| 119.5 | 3.3 | 36.5 | 413 | 392 |
| 120.5 | 3.3 | 36.8 | 416 | 394 |

TABLE 5

Heating Test for a Dual-Zone BeO Disc Heater, Zone 2, Test 2

| Zone 2 test 2 Applied Voltage (VAC) | Zone 2 test 2 Current (A) | Zone 2 test 2 Resistance (Ohms) | Zone 2 test 2 Temp (° C.) | Zone 2 test 2 Actual Watts (W) |
|---|---|---|---|---|
| 7.1 | 0.9 | 7.4 | 70 | 7 |
| 6.9 | 1 | 7.1 | 72 | 7 |
| 8 | 1.1 | 6.9 | 73 | 9 |
| 10.9 | 1.7 | 6.6 | 74 | 18 |
| 11 | 1.7 | 6.5 | 75 | 19 |
| 11.4 | 1.7 | 6.7 | 76 | 19 |
| 10.8 | 1.7 | 6.4 | 77 | 18 |
| 15.7 | 2.5 | 6.4 | 78 | 39 |
| 15.9 | 2.5 | 6.4 | 79 | 39 |
| 15.9 | 2.5 | 6.4 | 80 | 39 |
| 15.7 | 2.5 | 6.4 | 81 | 38 |
| 15.8 | 2.5 | 6.4 | 83 | 39 |
| 15.7 | 2.5 | 6.3 | 84 | 39 |
| 19.6 | 3.2 | 6.5 | 85 | 62 |
| 20.2 | 3.2 | 6.4 | 87 | 64 |
| 20.5 | 3.2 | 6.5 | 89 | 65 |
| 19.9 | 3.2 | 6.3 | 91 | 63 |
| 22.6 | 3.5 | 6.5 | 93 | 78 |

TABLE 5-continued

Heating Test for a Dual-Zone BeO Disc Heater, Zone 2, Test 2

| Zone 2 test 2 Applied Voltage (VAC) | Zone 2 test 2 Current (A) | Zone 2 test 2 Resistance (Ohms) | Zone 2 test 2 Temp (° C.) | Zone 2 test 2 Actual Watts (W) |
|---|---|---|---|---|
| 23.3 | 3.6 | 6.6 | 96 | 83 |
| 23.2 | 3.6 | 6.5 | 98 | 83 |
| 23.5 | 3.6 | 6.6 | 101 | 84 |
| 23.1 | 3.5 | 6.5 | 104 | 81 |
| 27.4 | 4.2 | 6.5 | 106 | 115 |
| 28.5 | 4.2 | 6.7 | 110 | 121 |
| 28 | 4.2 | 6.6 | 114 | 118 |
| 28.9 | 4.2 | 6.8 | 118 | 122 |
| 29.1 | 4.2 | 6.9 | 122 | 123 |
| 29.3 | 4.2 | 7 | 126 | 124 |
| 29.9 | 4.2 | 7.1 | 129 | 126 |
| 30 | 4.2 | 7.1 | 133 | 126 |
| 30.4 | 4.2 | 7.2 | 137 | 128 |
| 30.3 | 4.2 | 7.2 | 141 | 127 |
| 31.1 | 4.2 | 7.4 | 145 | 131 |
| 31.2 | 4.2 | 7.4 | 149 | 131 |
| 31.6 | 4.2 | 7.5 | 152 | 133 |
| 31.9 | 4.2 | 7.5 | 156 | 135 |
| 31.9 | 4.2 | 7.5 | 160 | 135 |
| 32.2 | 4.2 | 7.6 | 163 | 135 |
| 32.2 | 4.2 | 7.6 | 167 | 136 |
| 32.9 | 4.2 | 7.8 | 170 | 138 |
| 32.6 | 4.2 | 7.7 | 173 | 137 |
| 32.8 | 4.2 | 8 | 177 | 138 |
| 33 | 4.2 | 7.9 | 180 | 139 |
| 33.8 | 4.2 | 8 | 183 | 143 |
| 33.6 | 4.2 | 8 | 186 | 142 |
| 34.3 | 4.2 | 8.1 | 190 | 145 |
| 34.7 | 4.2 | 8.2 | 193 | 146 |
| 34.7 | 4.2 | 8.2 | 196 | 147 |
| 34.5 | 4.2 | 8.2 | 199 | 146 |
| 35.5 | 4.2 | 8.4 | 202 | 149 |
| 35.6 | 4.2 | 8.5 | 205 | 150 |
| 35.2 | 4.2 | 8.4 | 208 | 148 |
| 36.1 | 4.2 | 8.5 | 211 | 152 |
| 35.8 | 4.2 | 8.5 | 213 | 151 |
| 36.6 | 4.2 | 8.7 | 216 | 154 |
| 36.6 | 4.2 | 8.7 | 219 | 154 |
| 36.9 | 4.2 | 8.8 | 221 | 155 |
| 37.7 | 4.4 | 8.6 | 224 | 165 |
| 38.2 | 4.4 | 8.7 | 227 | 167 |
| 38.7 | 4.4 | 8.9 | 230 | 169 |
| 38.4 | 4.4 | 8.8 | 233 | 168 |
| 38.5 | 4.4 | 8.8 | 235 | 168 |
| 39.5 | 4.4 | 9.1 | 238 | 172 |
| 39.7 | 4.4 | 9.1 | 241 | 173 |
| 39.7 | 4.4 | 9.1 | 244 | 173 |
| 39.7 | 4.4 | 9.1 | 247 | 173 |
| 40 | 4.4 | 9.1 | 249 | 175 |
| 40.2 | 4.4 | 9.2 | 252 | 175 |
| 40.2 | 4.4 | 9.2 | 255 | 176 |
| 40.8 | 4.4 | 9.4 | 257 | 178 |
| 40.7 | 4.4 | 9.3 | 260 | 178 |
| 41.1 | 4.4 | 9.4 | 262 | 180 |
| 41.8 | 4.4 | 9.6 | 265 | 183 |
| 41 | 4.4 | 9.6 | 267 | 179 |
| 43.1 | 4.6 | 9.4 | 270 | 197 |
| 44.2 | 4.6 | 9.6 | 272 | 203 |
| 43.7 | 4.6 | 9.5 | 275 | 200 |
| 44.5 | 4.6 | 9.7 | 278 | 204 |
| 44 | 4.6 | 9.6 | 280 | 202 |
| 44.2 | 4.6 | 9.6 | 283 | 203 |
| 45.4 | 4.6 | 9.9 | 286 | 208 |
| 44.9 | 4.6 | 9.8 | 289 | 206 |
| 45.3 | 4.6 | 9.9 | 292 | 208 |
| 45.6 | 4.6 | 9.9 | 294 | 209 |
| 45.8 | 4.6 | 10.1 | 297 | 210 |
| 46.3 | 4.6 | 10 | 299 | 212 |
| 46.1 | 4.6 | 10.1 | 302 | 211 |
| 46.6 | 4.6 | 10.2 | 305 | 213 |
| 46.9 | 4.6 | 10.2 | 307 | 215 |
| 46.5 | 4.6 | 10.1 | 309 | 213 |
| 47.4 | 4.7 | 10.2 | 312 | 220 |

TABLE 5-continued

Heating Test for a Dual-Zone BeO Disc Heater, Zone 2, Test 2

| Zone 2 test 2 Applied Voltage (VAC) | Zone 2 test 2 Current (A) | Zone 2 test 2 Resistance (Ohms) | Zone 2 test 2 Temp (° C.) | Zone 2 test 2 Actual Watts (W) |
|---|---|---|---|---|
| 47.9 | 4.7 | 10.2 | 314 | 223 |
| 48 | 4.7 | 10.3 | 317 | 224 |
| 48.1 | 4.6 | 10.3 | 319 | 223 |
| 48.8 | 4.7 | 10.5 | 321 | 228 |
| 49 | 4.7 | 10.5 | 324 | 228 |
| 48.6 | 4.7 | 10.4 | 326 | 227 |
| 49.3 | 4.7 | 10.6 | 328 | 229 |
| 50.7 | 4.8 | 10.6 | 331 | 242 |
| 50.9 | 4.8 | 10.6 | 333 | 244 |
| 50.9 | 4.8 | 10.6 | 336 | 243 |
| 51 | 4.8 | 10.7 | 338 | 245 |
| 51 | 4.8 | 10.6 | 341 | 244 |
| 51 | 4.8 | 10.7 | 344 | 244 |
| 52.2 | 4.8 | 10.9 | 346 | 250 |
| 52.2 | 4.8 | 10.9 | 348 | 251 |
| 51.9 | 4.8 | 10.9 | 351 | 249 |
| 52.8 | 4.8 | 11 | 353 | 254 |
| 52.4 | 4.8 | 10.9 | 356 | 251 |
| 52.2 | 4.8 | 10.9 | 358 | 251 |
| 52.3 | 4.8 | 10.9 | 360 | 250 |
| 52.7 | 4.8 | 11 | 362 | 253 |
| 53.7 | 4.8 | 11.2 | 365 | 257 |
| 53.2 | 4.8 | 11.3 | 367 | 255 |
| 53.6 | 4.8 | 11.2 | 369 | 257 |
| 54.5 | 4.9 | 11.1 | 371 | 269 |
| 55.8 | 4.9 | 11.3 | 373 | 275 |
| 56.3 | 4.9 | 11.4 | 376 | 277 |
| 56.3 | 4.9 | 11.4 | 378 | 277 |
| 56.4 | 4.9 | 11.5 | 381 | 277 |
| 57 | 4.9 | 11.6 | 383 | 281 |
| 56.4 | 4.9 | 11.4 | 385 | 278 |
| 56.9 | 4.9 | 11.6 | 388 | 280 |
| 57.2 | 4.9 | 11.6 | 390 | 281 |
| 57.8 | 4.9 | 11.8 | 392 | 284 |
| 58.1 | 4.9 | 11.8 | 394 | 286 |
| 58.4 | 4.9 | 11.8 | 396 | 287 |
| 58.3 | 4.9 | 11.8 | 399 | 287 |
| 52.4 | 4.9 | 10.6 | 349 | 258 |
| 52.3 | 4.9 | 10.8 | 346 | 257 |
| 52.7 | 4.9 | 10.7 | 347 | 259 |
| 53.5 | 4.9 | 10.8 | 349 | 263 |
| 54.2 | 4.9 | 11 | 352 | 267 |
| 54.4 | 4.9 | 11 | 355 | 268 |
| 54.9 | 4.9 | 11.1 | 358 | 271 |
| 54.7 | 4.9 | 11.1 | 361 | 269 |
| 58.4 | 5.2 | 11.2 | 364 | 305 |
| 58.8 | 5.2 | 11.2 | 368 | 308 |
| 59.5 | 5.2 | 11.3 | 372 | 312 |
| 59.8 | 5.2 | 11.4 | 376 | 313 |
| 60.1 | 5.2 | 11.4 | 380 | 315 |
| 59.8 | 5.2 | 11.4 | 384 | 314 |
| 60.5 | 5.3 | 11.5 | 388 | 318 |
| 60.8 | 5.2 | 11.6 | 391 | 319 |
| 61.2 | 5.2 | 11.7 | 395 | 321 |
| 61.4 | 5.2 | 11.7 | 399 | 321 |
| 61.9 | 5.2 | 11.8 | 402 | 324 |
| 62.7 | 5.2 | 11.9 | 406 | 328 |
| 62.5 | 5.2 | 11.9 | 409 | 328 |
| 63.5 | 5.2 | 12.1 | 413 | 333 |
| 63.2 | 5.2 | 12.1 | 416 | 330 |

Figure 10:
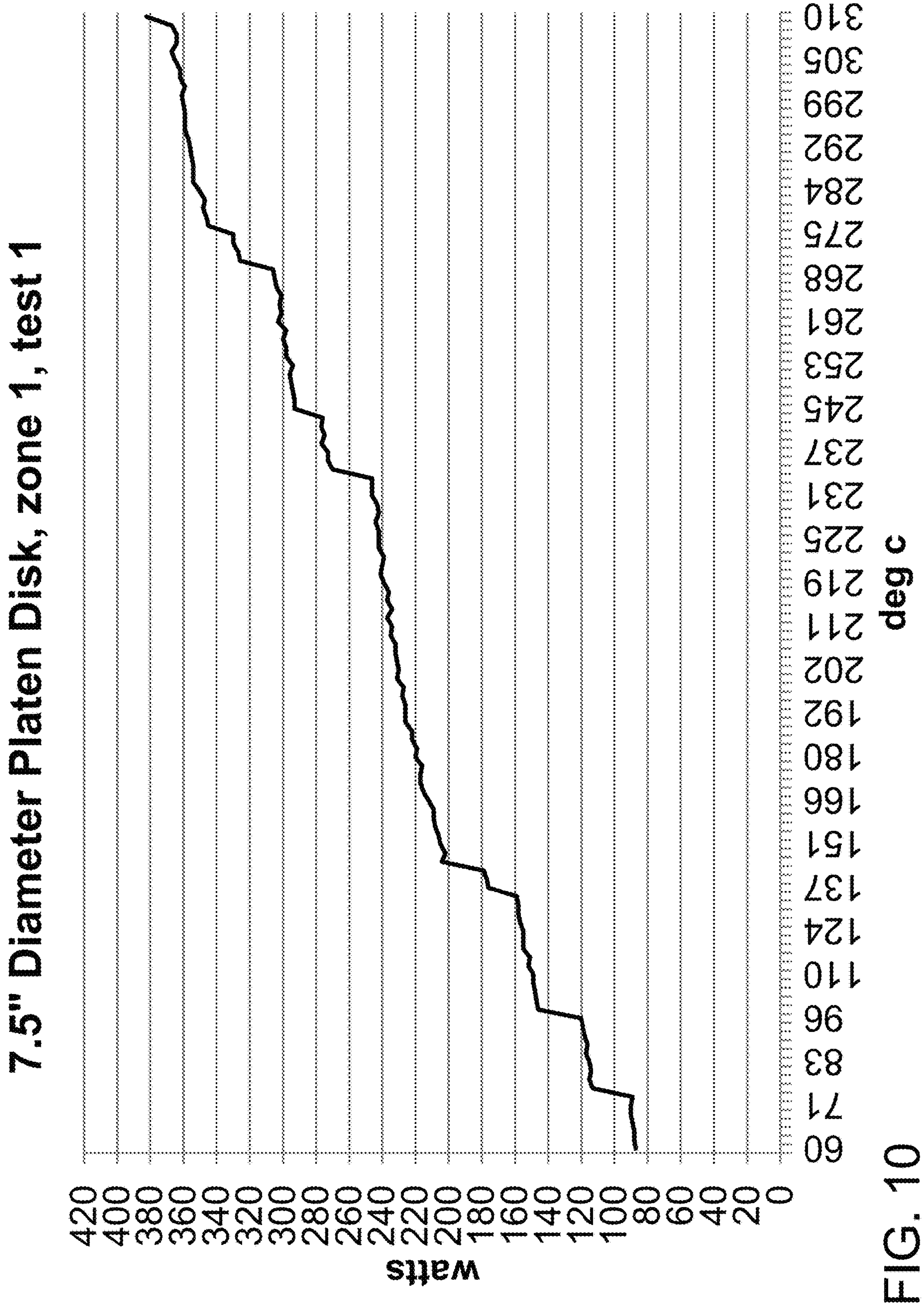
FIG. 10 is a chart showing actual wattage versus temperature for an applied voltage of about 40VAC to about 108VAC applied to a dual-zone integral resistance heater according to the present disclosure.
Figure 11:
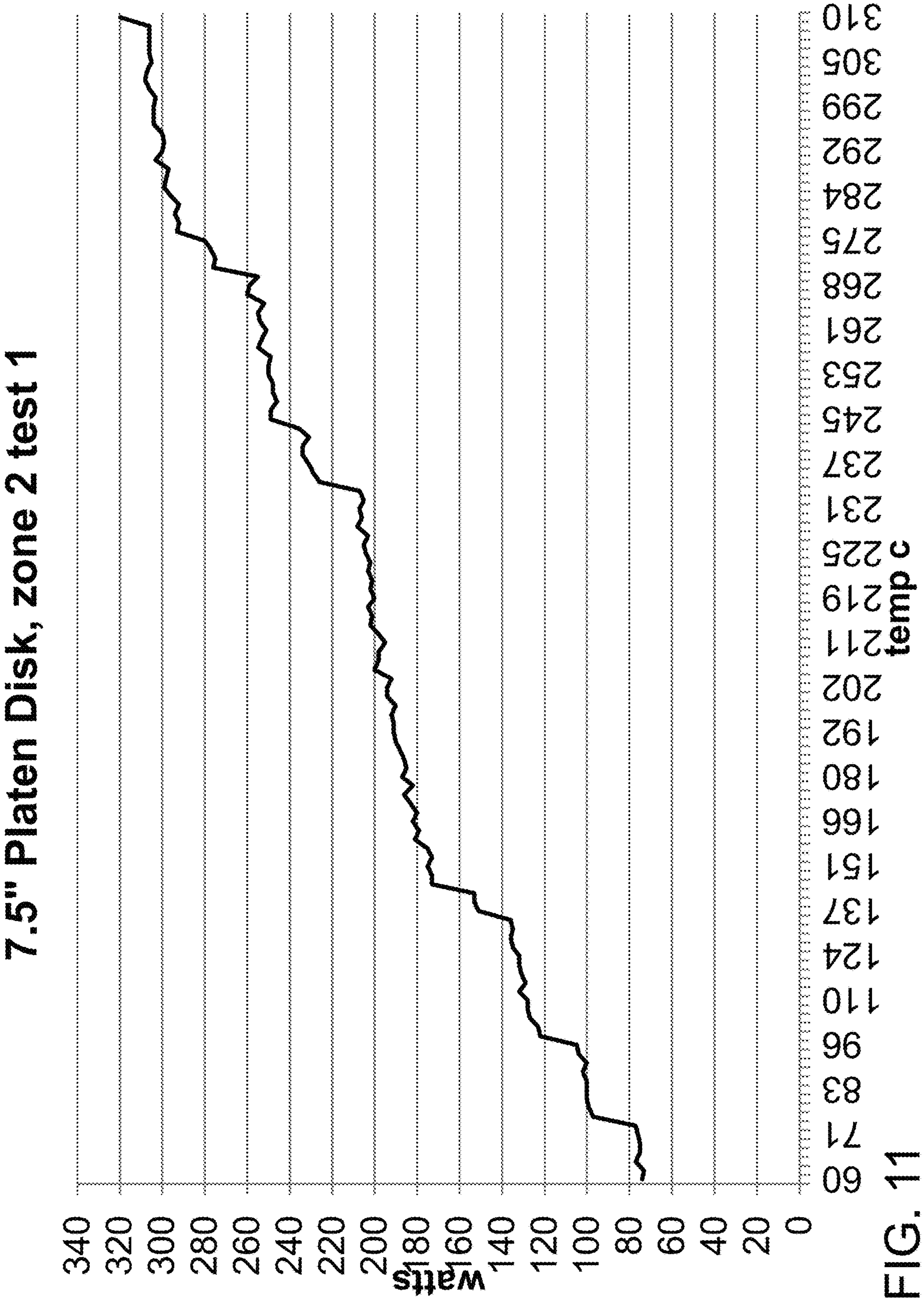
FIG. 11 is a chart showing actual wattage versus temperature for an applied voltage of about 21VAC to about 57VAC applied to a dual-zone integral resistance heater according to the present disclosure.
Figure 12:
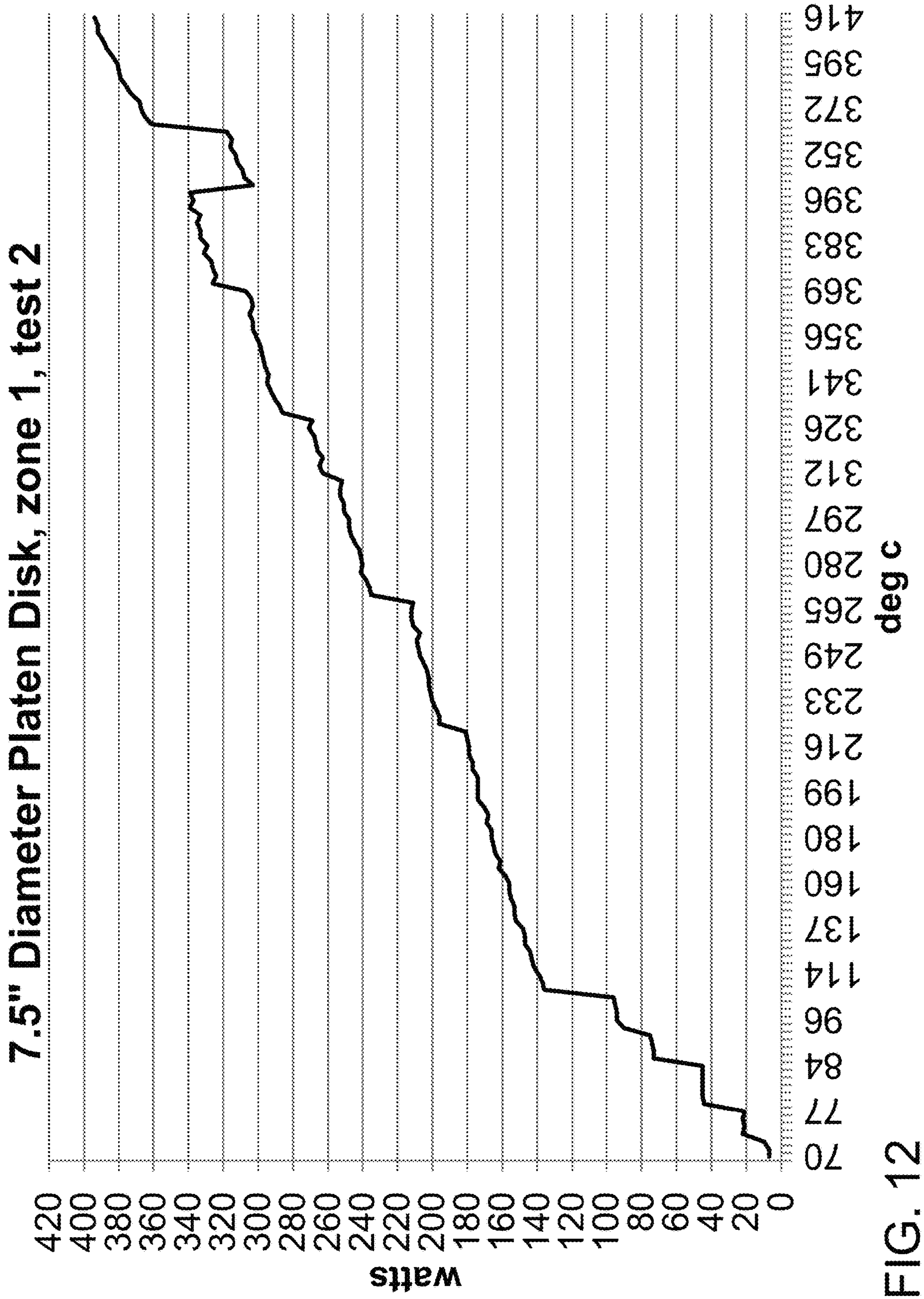
FIG. 12 is a chart showing actual wattage versus temperature for an applied voltage of about 13VAC to about 121VAC applied to a dual-zone integral resistance heater according to the present disclosure.
Figure 13:
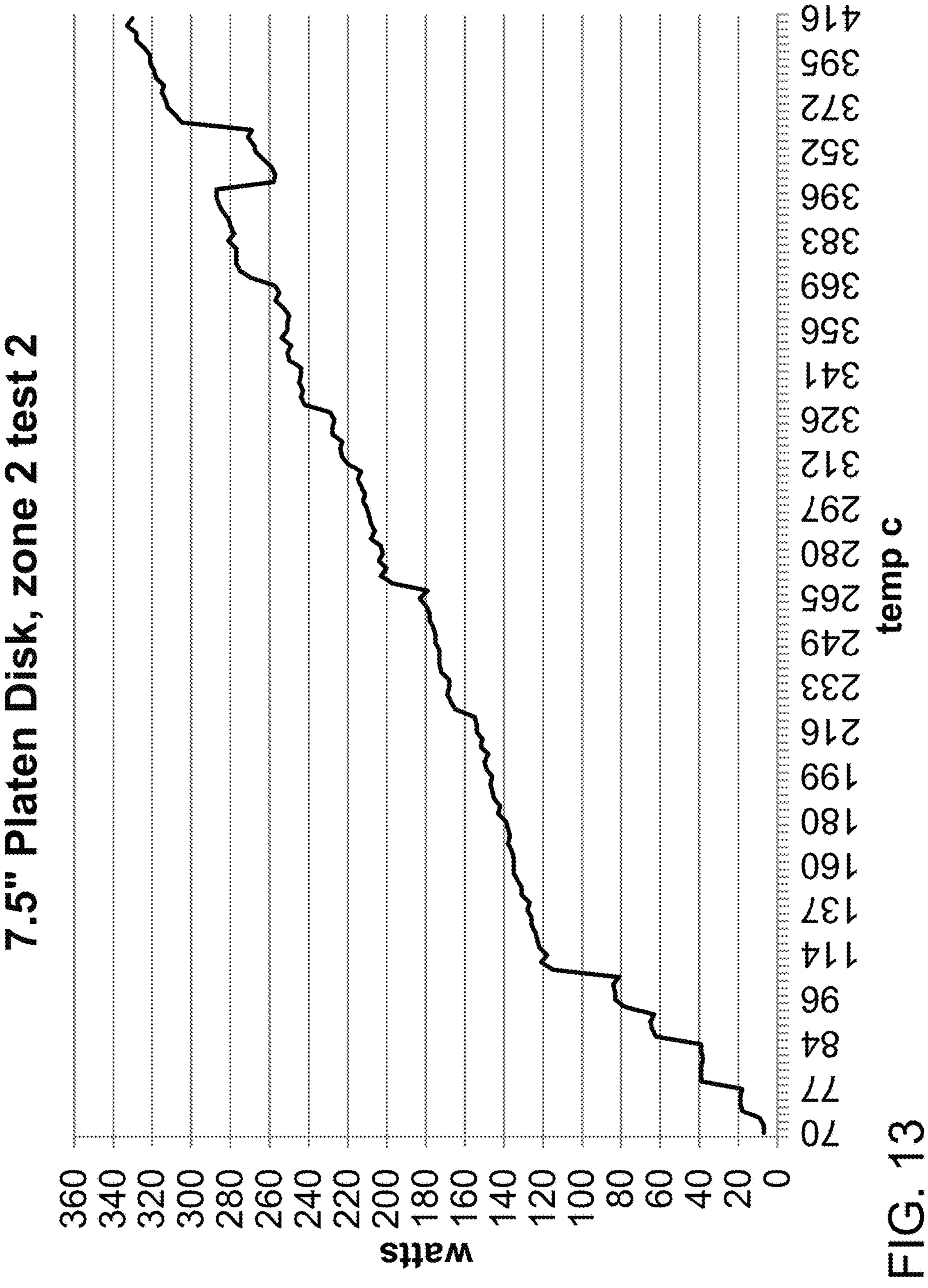
FIG. 13 is a chart showing actual wattage versus temperature for an applied voltage of about 7VAC to about 63VAC applied to a dual-zone integral resistance heater according to the present disclosure.
Figure 14:
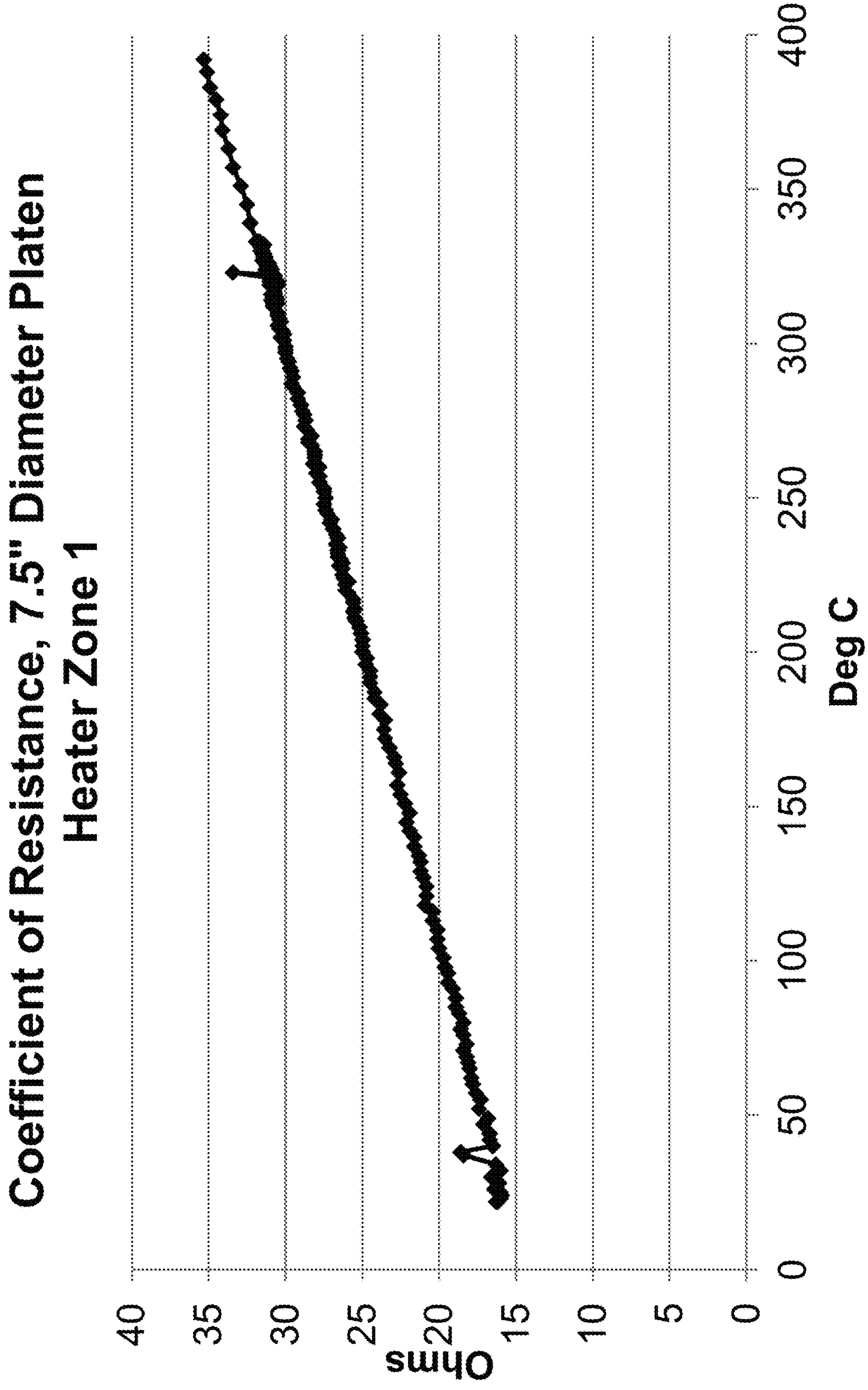
FIG. 14 is a chart showing resistance versus temperature for an applied voltage of about 17.5VAC to about 118VAC applied to a dual-zone integral resistance heater according to the present disclosure.

In FIGS. 10-14, actual wattage (W), resistance (ohms, Ω), and temperature (° C.) were plotted for the applied voltages of about 7V to 121V from Tables 2-5 above. As seen in FIG. 10, input voltages for zone 1, test 1 of about 40VAC-108VAC resulted in a maximum temperature of about 60° C.-310° C. and a maximum power output of about 87W-382W. In FIG. 11, input voltages for zone 2, test 1 of about 21VAC-57VAC resulted in a maximum temperature of about 60° C.-310° C. and a maximum power output of about 74W-320W. In FIG. 12, input voltages for zone 1, test 2 of about 13V-121V resulted in a maximum temperature of about 70° C.-416° C. and a maximum power of about 7W-394W. In FIG. 13, input voltages for zone 2, test 2 of about 7V-63V resulted in a maximum temperature of about 70° C.-416° C. and a maximum power of about 7W-330W. In FIG. 14, the coefficient of resistance (ohms, Ω) and temperature (° C.) was plotted for the applied voltages from zone 1 (FIGS. 10, 12). The resistance was about 18Ω-37Ω.

Example 5

Two heating element types were constructed according to the embodiment illustrated in FIG. 6. The first heating elements used a molybdenum (Mo) foil as the heating element material and the second heating elements used KOVAR as the heating element material. Three samples of the molybdenum (Mo) heating element were prepared and foil adhesion to a BeO ceramic body was measured in units of lbs-shear. Six samples of the KOVAR heating element were prepared and foil adhesion to a BeO ceramic body was measured in units of lbs-shear. The surface area of foil in contact with the BeO substrate was about 0.17 $in^2$ on each side, for both the molybdenum (Mo) and KOVAR type heating element samples. A calibrated load cell was used to measure compressive force at a load rate of 200 kpsi/min at room temperature. The samples were loaded on the bottom edge of the first plate, and the top edge of the second plate to simulate shear force. The foil adhesion results of the different molybdenum (Mo) and KOVAR heating elements are shown in Table 6 below.

TABLE 6

| Foil Adhesion on BeO Ceramic Body | | |
|---|---|---|
| Sample No. | KOVAR Foil Adhesion (lbs-shear) | Molybdenum (Mo) Foil Adhesion (lbs-shear) |
| 1 | 917 | 225 |
| 2 | 981 | 317 |
| 3 | 1088 | 226 |
| 4 | 1088 | — |
| 5 | 1088 | — |
| 6 | 946 | — |

Figure 15:
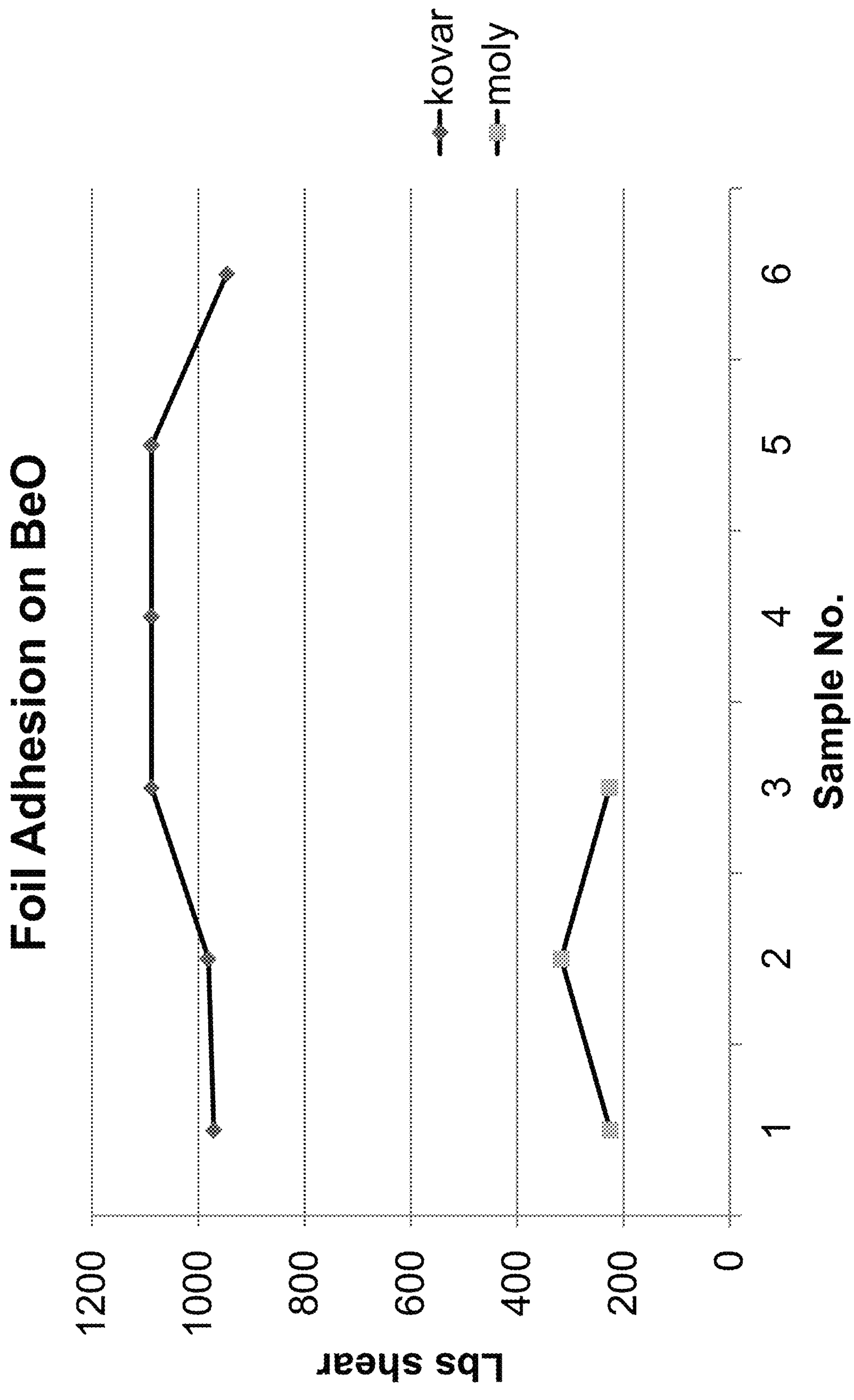
FIG. 15 is a chart showing foil adhesion for a molybdenum (Mo) and KOVAR heating element bonded to a ceramic body of an integral resistance heater according to the present disclosure.

In FIG. 15, the maximum achieved adhesion for each of the samples was plotted. Sample 2 of the molybdenum (Mo) heating element achieved a maximum adhesion of about 300 lbs-shear. Samples 3-5 of the KOVAR heating element all achieved a maximum adhesion of greater than about 1088 lbs-shear, which is the upper limit at which the load cell stops measuring.

The present disclosure has been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. An integral resistance heater, comprising:

a beryllium oxide (BeO) ceramic body having a first surface and a second surface opposite the first surface, and a first heating element formed from a refractory metallizing layer and bonded to the first surface of the beryllium oxide ceramic body and a second heating element formed from the refractory metallizing layer and bonded to the second surface of the beryllium oxide ceramic body, wherein first and second heating elements comprise electrically conductive outer surfaces coated by a metal plating, wherein the metal plating is configured to prevent oxidation of the first and second heating elements, wherein the first and second heating elements are connected to first and second heater terminals and operated independently biased; and a beryllium oxide ceramic top plate and a beryllium oxide ceramic base plate, wherein the beryllium oxide ceramic body is disposed between the top plate and the base plate to form a sandwich structure, and wherein the top plate includes an exposed top surface to hold a wafer during semiconductor processing.

2. The integral resistance heater of claim 1, wherein the refractory metallizing layer contains molybdenum or tungsten.

3. The integral resistance heater of claim 2, wherein the refractory metallizing layer contains $MoSi_2$ or moly-manganese.

4. The integral resistance heater of claim 1, further comprising at least one power source connected to the heater terminals for controlling the first and second heating elements.

5. The integral resistance heater of claim 4, wherein a first power source controls the first heating element and a second power source controls the second heating element, wherein the first and second power sources independently provide a voltage to the first and second heating elements.

6. The integral resistance heater of claim 4, wherein a first power source controls the first heating element and a second power source controls the second heating element, wherein the first and second power sources cooperatively provide a voltage to the first and second heating elements.

7. The integral resistance heater of claim 1, wherein the first heating element is printed using screen-printing, roll coating, or air brushing.

8. The integral resistance heater of claim 1, wherein the BeO ceramic body is in the shape of a square plate, rectangular plate, platen, or disc.

9. The integral resistance heater of claim 1, wherein the first heating element is patterned in the shape of a spiral, a series of concentric circles, or a zigzag.

10. The integral resistance heater of claim 1, wherein the metal plating is selected from the group consisting of nickel, gold, silver, and copper.

11. The integral resistance heater of claim 1, wherein the metal plating is applied by an electrolytic process.

12. The integral resistance heater of claim 1, wherein the refractory metallizing layer is a foil.

13. The integral resistance heater of claim 1, wherein the integral resistance heater has a resistance from 13.0Ω to 15.8Ω at an applied voltage of 60 V as measured for a 2"×2" square.

14. The integral resistance heater of claim 1, wherein the integral resistance heater has a resistance from 18Ω to 37Ω at an applied voltage from 17.5VAC to about 118VAC as measured for a 7.5" platen.

15. An integral resistance heater, comprising:

a beryllium oxide (BeO) ceramic body having a first surface and a second surface opposite the first surface, and a first heating element formed from a refractory metallizing layer and bonded to the first surface of the beryllium oxide ceramic body and a second heating element formed from the refractory metallizing layer and bonded to the second surface of the beryllium oxide ceramic body, wherein the first and second heating elements are connected to first and second heater terminals and operated independently biased; and a beryllium oxide ceramic top plate and a beryllium oxide ceramic base plate, wherein the beryllium oxide ceramic body is disposed between the top plate and the base plate to form a sandwich structure, wherein the top plate includes an exposed top surface to hold a wafer during semiconductor processing, wherein the refractory metallizing layer includes non-metallic components, wherein the non-metallic components diffuse into grain boundaries in the beryllium oxide (BeO) ceramic body, and wherein first and second heating elements comprise electrically conductive outer surfaces coated by a metal plating, wherein the metal plating is configured to prevent oxidation of the first and second heating elements.

16. The integral resistance heater of claim 15, wherein the non-metallic components include glass powders.

17. A dual-zone integral resistance heater, comprising:

a beryllium oxide (BeO) ceramic body having a first surface and a second surface opposite the first surface and a thickness there between, a first heating element formed from a refractory metallizing layer and bonded to the first surface of the beryllium oxide ceramic body, and a second heating element formed from the refractory metallizing layer and bonded to the second surface of the beryllium oxide ceramic body, wherein first and second heating elements comprise electrically conductive outer surfaces coated by a metal plating, wherein the metal plating is configured to prevent oxidation of the first and second heating elements, wherein the first and second heating elements are connected to first and second heater terminals in parallel and independently operated, and the first and second heating elements are configured to provide first and second planar temperature zones separated by a distance equal to the thickness of the beryllium oxide ceramic body, and a beryllium oxide ceramic top plate disposed adjacent to the second surface, wherein the top plate includes an exposed top surface to hold a wafer during semiconductor processing.

18. The dual-zone integral resistance heater of claim 17, wherein the metal plating is selected from the group consisting of nickel, gold, silver, and copper.

19. The dual-zone integral resistance heater of claim 17, wherein the metal plating is applied by an electrolytic process.

* * * * *